(12) United States Patent
Li et al.

(10) Patent No.: US 11,558,608 B2
(45) Date of Patent: Jan. 17, 2023

(54) ON SPLIT PREDICTION

(71) Applicant: Lemon Inc., Grand Cayman (KY)

(72) Inventors: Yue Li, San Diego, CA (US); Li Zhang, San Diego, CA (US); Jizheng Xu, San Diego, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/512,162

(22) Filed: Oct. 27, 2021

(65) Prior Publication Data
US 2022/0132103 A1 Apr. 28, 2022

Related U.S. Application Data

(60) Provisional application No. 63/106,603, filed on Oct. 28, 2020.

(51) Int. Cl.
| | |
|---|---|
| *H04N 19/105* | (2014.01) |
| *H04N 19/119* | (2014.01) |
| *H04N 19/96* | (2014.01) |
| *H04N 19/159* | (2014.01) |
| *G06T 9/40* | (2006.01) |
| *H04N 19/176* | (2014.01) |
| *G06T 9/00* | (2006.01) |
| *G06V 10/94* | (2022.01) |

(52) U.S. Cl.
CPC ........... *H04N 19/105* (2014.11); *G06T 9/002* (2013.01); *G06T 9/40* (2013.01); *G06V 10/95* (2022.01); *H04N 19/119* (2014.11); *H04N 19/159* (2014.11); *H04N 19/176* (2014.11); *H04N 19/96* (2014.11)

(58) Field of Classification Search
CPC .. H04N 19/105; H04N 19/119; H04N 19/159; H04N 19/176; H04N 19/96; H04N 19/136; H04N 19/184; H04N 19/593; H04N 19/60; H04N 19/61; H04N 19/625; H04N 19/86; G06T 9/002; G06T 9/40; G06V 10/95
See application file for complete search history.

(56) References Cited

U.S. PATENT DOCUMENTS

2011/0013695 A1* 1/2011 Endo ................ H04N 19/61
375/E7.125

OTHER PUBLICATIONS

Wang, et al., "Preview Document JVET-S2001 for Teleconference Meeting," MPEG No. m54716, http://phenix.it-sudparis.eu/jvet/doc_end_user/current_document.php?id=10399, downloaded Jan. 19, 2022, 1 page.

Karsten Suehrig, "VTM Version 10.0," https://vcgit.hhi.fraunhofer.de/jvet/VVCSoftware_VTM/tags/VTM-10.0, downloaded Jan. 19, 2022, 2 pages.

(Continued)

*Primary Examiner* — Nam D Pham
(74) *Attorney, Agent, or Firm* — Conley Rose, P.C.

(57) ABSTRACT

A method implemented by a coding apparatus. The method includes obtaining probabilities of split types being implemented when partitioning a picture, and skipping one or more of the split types based on the probabilities obtained when a coding block is partitioned during a conversion between a video media file and a bitstream. A corresponding apparatus and non-transitory computer readable medium are also provided.

19 Claims, 27 Drawing Sheets

(56) References Cited

OTHER PUBLICATIONS

Santiago De-Luxán-Hernández, et al., "CE3: Intra Sub-Partitions Coding Mode (Tests 1.1.1 and 1.1.2)," Document JVET-M0102-V5, Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.

Moonmo Koo, et al., "CE6: Reduced Secondary Transform (RST) (CE6-3.1)," Document JVET-N0193, Joint Video Experts Team (JVET) of ITU-T SG 16 WP 3 and ISO/IEC JTC 1/SC 29/WG 11, 14th Meeting: Geneva, CH, Mar. 19-27, 2019, 19 pages.

Mehdi Salehifar, et al., "CE 6.2.6: Reduced Secondary Transform (RST)," Document JVET-K0099, Joint Video Experts Team (JVET) of ITU-T SG 16 WP 3 and ISO/IEC JTC 1/SC 29/WG 11, 11th Meeting: Ljubljana, SI, Jul. 10-18, 2018, 12 pages.

Moonmo Koo, et al., "CE 6-2.1: Reduced Secondary Transform (RST)," Document JVET-L0133, Joint Video Experts Team (JVET) of ITU-T SG 16 WP 3 and ISO/IEC JTC 1/SC 29/WG 11, 12th Meeting: Macao, CN, Oct. 3-12, 2018, 8 pages.

Jonathan Pfaff, et al., "CE3: Affine linear weighted intra prediction (CE3-4.1, CE3-4.2)," Document JVET-N0217, Joint Video Experts Team (JVET) of ITU-T SG 16 WP 3 and ISO/IEC JTC 1/SC 29/WG 11, 14th Meeting: Geneva, CH, Mar. 19-27, 2019, 17 pages.

Frank Bossen, et al., "AHG report: Test model software development (AHG3)," Document JVET-Q0003-v1, Joint Video Experts Team (JVET) of ITU-T SG 16 WP 3 and ISO/IEC JTC 1/SC 29/WG 11, 17th Meeting: Brussels, BE, Jan. 7-17, 2020, 12 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

"Line Transmission of Non-Telephone Signals, Video Codec for Audiovisual Services at p × 64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Versatile Video Coding," Series H: Audiovisual and Multimedia Systems Infrastructure of audiovisual services—Coding of moving video, ITU-T H.266, Aug. 2020, 516 pages.

"Video Coding for Low Bit Rate Communication," Series H: Auddiovisual and Multimedia Systems Infrastructure of Audiovisual Services—Coding of Moving Video, ITU-T H.263, Jan. 2005, 226 pages.

Bossen, et al., "AHG report: Test model software development (AHG3)," Document JVET-Q0003-v1, Joint Video Experts Team (JVET) of ITU-T SG 16 WP 3 and ISO/IEC JTC 1/SC 29/WG 11 17th Meeting: Brussels, BE, Jan. 7-17, 2020, 12 pages.

Bross, et al., "Versatile Video Coding," Document JVET-S2001-vA, Draft 10, Joint Video Experts Team (JVET) of ITU-T SG 16 WP 3 and ISO/IEC JTC 1/SC 29/WG 11 19th Meeting: by teleconference, Jun. 22-Jul. 1, 2020 548 pages.

Park, et al., "Context-based Ternary Tree Decision Method in Versatile Video Coding for Fast Intra Coding," IEEE Access, Digital Object Identifier 10.1109/Access.2017.Doi Number 10.1109/ACCESS.2019.2956196,, 9 pages.

Tissier, et al., "CNN Oriented Complexity Reduction of VVC Intra Encoder," University of Exeter. Downloaded on Nov. 14, 2020 at 09:07:43 UTC from IEEE Xplore, pp. 3139-3143.

\* cited by examiner

1600

| Class | Sequence | Proposed (Implicit) | | Proposed (Explicit) | |
|---|---|---|---|---|---|
| | | BD-BR | $\Delta$ET | BD-BR | $\Delta$ET |
| Class A1 | Tango2 | 0.55% | 63.6% | 0.17% | 37.7% |
| | FoodMarket4 | 0.39% | 56.8% | 0.12% | 33.9% |
| | Campfire | 0.85% | 54.9% | 0.42% | 39.2% |
| Class A2 | CatRobot | 0.69% | 52.4% | 0.32% | 35.7% |
| | DaylightRoad2 | 0.61% | 57.8% | 0.33% | 43.2% |
| | ParkRunning3 | 0.24% | 51.0% | 0.11% | 34.6% |
| Class B | MarketPlace | 0.52% | 69.3% | 0.18% | 45.2% |
| | RitualDance | 0.54% | 57.9% | 0.27% | 41.1% |
| | Cactus | 0.43% | 55.3% | 0.27% | 43.2% |
| | BasketballDrive | 0.52% | 58.5% | 0.35% | 47.7% |
| | BQTerrace | 0.53% | 47.0% | 0.52% | 36.7% |
| Class C | BasketballDrill | 0.56% | 39.5% | 0.75% | 37.1% |
| | BQMall | 0.40% | 49.1% | 0.26% | 40.7% |
| | PartyScene | 0.13% | 40.2% | 0.15% | 40.1% |
| | RaceHorsesC | 0.34% | 46.1% | 0.30% | 40.6% |
| Class D | BasketballPass | 0.32% | 46.9% | 0.25% | 37.3% |
| | BQSquare | 0.28% | 42.4% | 0.17% | 38.6% |
| | BlowingBubbles | 0.11% | 38.0% | 0.16% | 35.7% |
| | RaceHorses | 0.33% | 45.7% | 0.20% | 33.7% |
| Class E | FourPeople | 0.70% | 53.0% | 0.29% | 39.7% |
| | Johnny | 0.63% | 55.4% | 0.34% | 41.0% |
| | KristenAndSara | 0.53% | 55.6% | 0.29% | 43.3% |
| Average | | 0.46% | 52.3% | 0.28% | 39.5% |

FIG. 16

| Class | Park et al. [5] VTM-4.0 | | Tissier et al. [8] VTM-6.1, β=20 | | Tissier et al. [8] VTM-6.1, β=30 | | Proposed (I) VTM-7.0 | | Proposed (E) VTM-7.0 | |
|---|---|---|---|---|---|---|---|---|---|---|
| | BD-BR | ΔET | BD-BR | ΔET | BD-BR | ΔET | BD-BR | ΔET | BD-BR | ΔET |
| Class A1 | 0.64% | 32.0% | 0.87% | 56.3% | 1.55% | 62.9% | 0.59% | 58.6% | 0.25% | 37.0% |
| Class A2 | 0.97% | 33.0% | 0.83% | 52.6% | 1.47% | 60.0% | 0.51% | 53.8% | 0.25% | 37.9% |
| Class B | 0.90% | 33.0% | 0.75% | 51.5% | 1.41% | 61.1% | 0.51% | 58.2% | 0.32% | 42.9% |
| Class C | 1.06% | 35.0% | 0.56% | 26.4% | 1.20% | 37.9% | 0.35% | 43.9% | 0.37% | 39.6% |
| Class D | 0.76% | 35.0% | 0.33% | 22.7% | 0.83% | 32.5% | 0.26% | 43.4% | 0.19% | 36.3% |
| Class E | 1.29% | 34.0% | 1.18% | 45.8% | 2.29% | 54.4% | 0.62% | 54.7% | 0.31% | 41.4% |
| Average | 0.93% | 34.0% | 0.75% | 42.2% | 1.45% | 51.5% | 0.46% | 52.3% | 0.28% | 39.5% |

ON SPLIT PREDICTION

CROSS-REFERENCE TO RELATED APPLICATIONS

This patent application claims the benefit of U.S. Provisional Patent Application No. 63/106,603 filed Oct. 28, 2020, by Lemon, Inc., and titled "On Split Prediction," which is hereby incorporated by reference.

TECHNICAL FIELD

The present disclosure is generally related to video coding and, in particular, to encoder optimization and block splitting prediction in image/video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide techniques for partitioning a coding block using information received from a convolutional neural network (CNN). The techniques permit a coding apparatus (e.g., an encoder) to partition the coding block more efficiently than known techniques. For example, the techniques may include disregarding split types determined to be below a predetermined threshold when the coding block is partitioned, deriving probabilities of the split types being implemented after identifying all possible partitioning structures for the coding block and considering a predetermined number of split types and a predetermined depth, and/or examining a partitioning result of each subblock in the coding block using the split types above the predetermined threshold. Therefore, coding time is improved relative to existing coding solutions.

A first aspect relates to a method implemented by a coding apparatus. The method includes obtaining probabilities of split types being implemented when partitioning a picture, and skipping one or more of the split types based on the probabilities obtained when a coding block is partitioned during a conversion between a video media file and a bitstream.

Optionally, in any of the preceding aspects, another implementation of the aspect provides obtaining probabilities of split types being implemented further comprises deriving probabilities of split types being implemented based on probabilities of split type boundaries coinciding with subblock boundaries of the coding block.

Optionally, in any of the preceding aspects, another implementation of the aspect provides determining which of the split types are below a predetermined threshold based on the probabilities and skipping the one or more of the split types determined to be below the predetermined threshold when the coding block is being partitioned.

Optionally, in any of the preceding aspects, another implementation of the aspect provides that the split types comprise a non-split type, a quad tree split type, a binary tree split type, and a ternary tree split type.

Optionally, in any of the preceding aspects, another implementation of the aspect provides that a probability of a j-th subblock boundary from the subblock boundaries is represented as $\{p_j^{Non}, p_j^{QT}, p_j^{BT}, p_j^{TT}\}$, where p represents the probability of the split type, where Non represents a non-split split type, QT represents a quad tree split type, BT represents a binary tree split type, TT represents a ternary tree split type, where j is an element of $\{1, 2, 3, \ldots K\}$, and where K represents a total number of the subblock boundaries in the coding block.

Optionally, in any of the preceding aspects, another implementation of the aspect provides that the probabilities of split type boundaries coinciding with subblock boundaries are based on an a×b probability vector, where a represents a total number of split types for a subblock of the coding block, and where b represents a total number of the subblock boundaries in the coding block.

Optionally, in any of the preceding aspects, another implementation of the aspect provides that the probabilities of split types being implemented is based on one of all of the subblock boundaries in the coding block, a subset of the subblock boundaries in the coding block, an average of probabilities, a weighted average of probabilities.

Optionally, in any of the preceding aspects, another implementation of the aspect provides that one probability from the probabilities of the split types is derived based on $\mathrm{avg}\{p_{i_1}^{ST}, p_{i_2}^{ST}, p_{i_3}^{ST} \ldots, p_{i_x}^{ST}\}$, where p represents the probability of the split type, where i represents a subblock boundary from the subblock boundaries, where ST represents one of a quad tree split type, a horizontal binary tree split type, a vertical binary tree split type, a horizontal ternary tree split type, and a vertical ternary tree split type, and wherein x represents a number of the subblock boundaries in the coding block.

Optionally, in any of the preceding aspects, another implementation of the aspect provides that obtaining probabilities of split types being implemented comprises receiving an input from a convolutional neural network identifying all possible partitioning structures for the coding block considering a predetermined number of split types and a predetermined depth.

Optionally, in any of the preceding aspects, another implementation of the aspect provides deriving a probability distribution for all of the possible partitioning structures based on the input, wherein the probability distribution includes a probability of each of the split types being implemented.

Optionally, in any of the preceding aspects, another implementation of the aspect provides that the input identifying all possible partitioning structures for the coding block is based on a sum of possible splits for a no-split type, a quad tree split type, a horizontal binary tree split type, a vertical binary tree split type, a horizontal ternary tree split type, and a vertical ternary tree split type.

Optionally, in any of the preceding aspects, another implementation of the aspect provides that obtaining probabilities of split types being implemented comprises receiving an input from a convolutional neural network, the input identifying split types for the coding block.

Optionally, in any of the preceding aspects, another implementation of the aspect provides determining which of the split types are above a predetermined threshold, and examining a partitioning result of each subblock in the coding block using the split types determined to be above the predetermined threshold.

A second aspect relates to an apparatus for coding video data comprising a processor and a non-transitory memory with instructions thereon, wherein the instructions upon execution by the processor cause the processor to: obtain probabilities of split types being implemented; and skip one or more of the split types based on the probabilities obtained when a coding block is partitioned.

Optionally, in any of the preceding aspects, another implementation of the aspect provides that the one or more processors are further configured to derive probabilities of split types being implemented based on probabilities of split type boundaries coinciding with subblock boundaries of the coding block.

Optionally, in any of the preceding aspects, another implementation of the aspect provides that the one or more processors are further configured to receive an input from a convolutional neural network identifying all possible partitioning structures for the coding block considering a predetermined number of split types and a predetermined depth.

Optionally, in any of the preceding aspects, another implementation of the aspect provides that the one or more processors are further configured to determine which of the split types are above a predetermined threshold, and examine a partitioning result of each subblock in the coding block using the split types determined to be above the predetermined threshold.

A third aspect relates to a non-transitory computer readable medium comprising a computer program product for use by a coding apparatus, the computer program product comprising computer executable instructions stored on the non-transitory computer readable medium that, when executed by one or more processors, cause the coding apparatus to: obtain probabilities of split types being implemented; and skip one or more of the split types based on the probabilities obtained when a coding block is partitioned.

Optionally, in any of the preceding aspects, another implementation of the aspect provides that the instructions further cause the coding apparatus to derive probabilities of split types being implemented based on probabilities of split type boundaries coinciding with subblock boundaries of the coding block.

Optionally, in any of the preceding aspects, another implementation of the aspect provides that the instructions further cause the coding apparatus to derive a probability distribution for all of the possible partitioning structures based on an input from a convolutional neural network identifying all possible partitioning structures for the coding block considering a predetermined number of split types and a predetermined depth, wherein the probability distribution includes a probability of each of the split types being implemented.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 16 illustrates a table that gives the performances of the proposed implicit and explicit partitioning prediction at certain thresholds.

FIG. 17 illustrates a table that proposed schemes perform favorably against another method.

DETAILED DESCRIPTION

Figure 1:
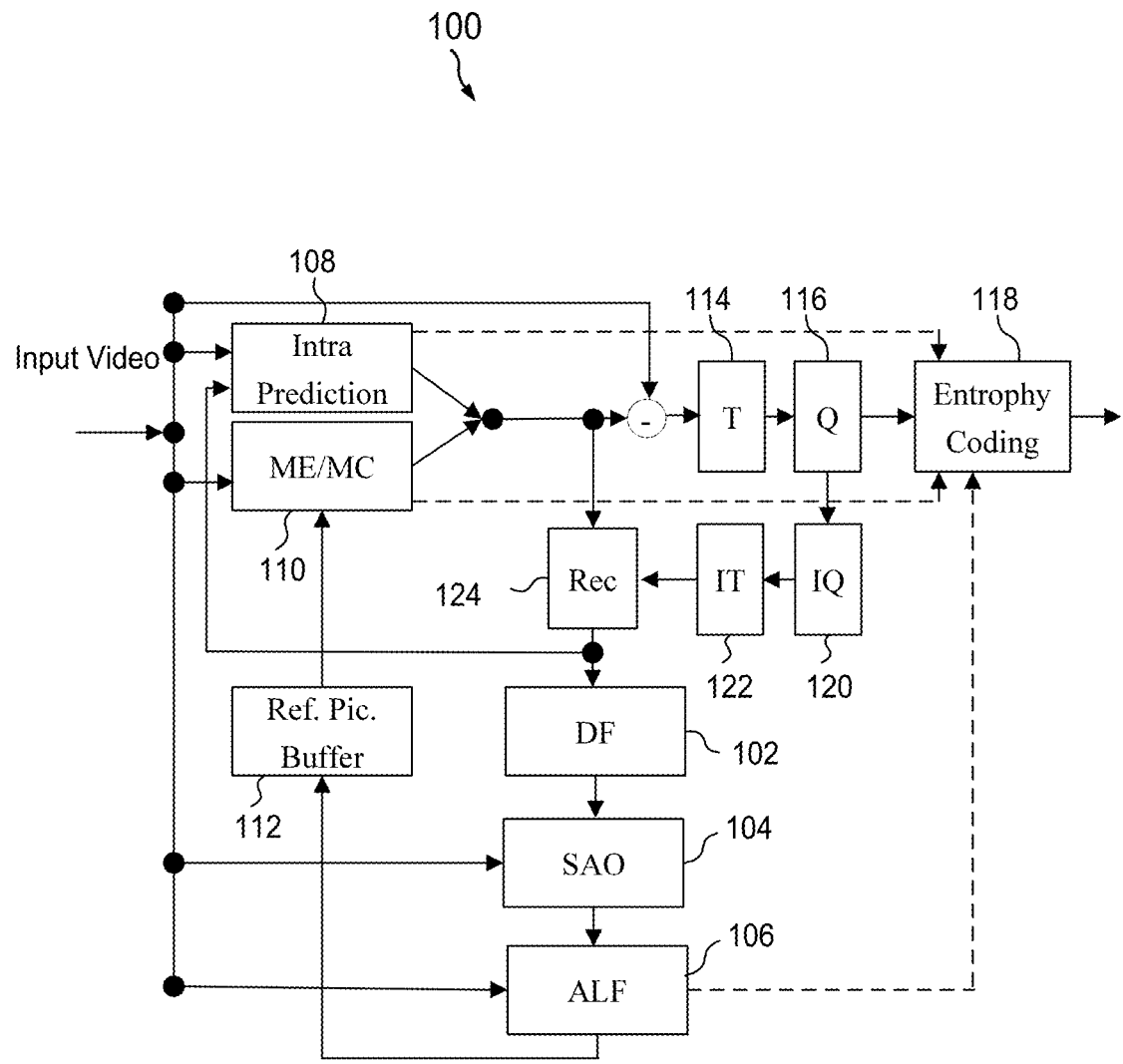
FIG. 1 is a schematic diagram of an encoder.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, is a video compression standard finalized on Jul. 6, 2020, by the Joint Video Experts Team (JVET), a joint video expert team of the Video Coding Experts Group (VCEG) working group of International Telecommunication Union Telecommunication Standardization Sector (ITU-T) Study Group 16 and the Moving Picture Experts Group (MPEG) working group of International Organization for Standardization (ISO)/International Electrotechnical Commission (IEC) joint technical committee (JTC) 1. VVC is the successor to High Efficiency Video Coding (HEVC), also known as ITU-T H.265. VVC terminology is used in some of the description only for ease of understanding and not for limiting the scope of the disclosed techniques. As such, the techniques described herein are applicable to other video codec protocols and designs also.

The present disclosure is related to image/video coding technologies. Specifically, the present disclosure is related to encoder optimization and block splitting prediction in image/video coding. The techniques described in the present disclosure may be applied to existing video coding standards such as, for example, HEVC, VVC, or the third generation Audio Video Coding Standard (AVS3). The techniques may be also applicable to future video coding standards or video codecs.

Video coding standards have evolved primarily through the development of the well-known ITU-T and ISO/IEC standards. The ITU-T produced H.261 and H.263, ISO/IEC produced MPEG standards MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on a hybrid video coding structure where temporal prediction plus transform coding are utilized. To explore the future video coding technologies beyond HEVC, VET was founded by VCEG and MPEG jointly in 2015. Since then, many new methods have been adopted by JVET and put into the reference software named Joint Exploration Model (JEM). In April 2018, the VET between VCEG (Q6/16) and ISO/IEC JTC1 SC29/WG11 (MPEG) was created to work on the VVC standard. The target goal of the VVC standard was a fifty percent (50%) bitrate reduction compared to HEVC. VVC version 1 was finalized in July 2020.

The latest version of VVC draft, i.e., Versatile Video Coding Draft 10 is publicly available at: http://phenix.it-sudparis.eu/jvet/doc_end_user/current_document.php?id=10399. The latest reference software of VVC, named the VVC Test model (VTM), is publicly available at: https://vcgit.hhi.fraunhofer.de/jvet/VVCSoftware_VTM/tags/VTM-10.0

FIG. 1 is a schematic diagram of an encoder 100. The encoder 100 is suitable for implementing the techniques of VVC. The encoder 100 includes three in-loop filters, namely a deblocking filter (DF) 102, a sample adaptive offset (SAO) 104, and an adaptive loop filter (ALF) 106. Unlike the DF 102, which uses predefined filters, the SAO 104 and the ALF 106 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 106 is located at the last processing stage of each picture and can be regarded as a tool trying to catch and fix artifacts created by the previous stages.

The encoder 100 further includes an intra prediction component 108 and a motion estimation/compensation (ME/MC) component 110 configured to receive input video. The intra prediction component 108 is configured to perform intra prediction, while the ME/MC component 110 is configured to utilize reference pictures obtained from a reference picture buffer 112 to perform inter prediction. Residual blocks from inter prediction or intra prediction are fed into a transform component 114 and a quantization component 116 to generate quantized residual transform coefficients, which are fed into an entropy coding component 118. The entropy coding component 118 entropy codes the prediction results and the quantized transform coefficients and transmits the same toward a video decoder (not shown). Quantization components output from the quantization component 116 may be fed into an inverse quantization components 120, an inverse transform component 122, and a reconstruction (REC) component 124. The REC component 124 is able to output images to the DF 102, the SAO 104, and the ALF 106 for filtering prior to those images being stored in the reference picture buffer 112.

Pictures/Slices/Tiles are divided into a sequence of coding tree units (CTUs). The CTU concept discussed herein is same as that of HEVC. For a picture that has three sample arrays (e.g., non-monochrome cases), a CTU consists of an N×N block of luma samples together with two corresponding blocks of chroma samples. The maximum allowed size of the luma block in a CTU is specified to be 128×128 (although the maximum size of the luma transform blocks is 64×64).

In HEVC, a CTU is split into coding units (CUs) using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two, or four prediction units (PUs) according to the PU splitting type. Inside one PU, the same prediction process is applied, and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One key feature of the HEVC structure is that the HEVC structure has the multiple partition conceptions including CU, PU, and TU.

In VVC, a quadtree with nested multi-type tree (MTT) using binary and ternary splits segmentation structure replaces the concepts of multiple partition unit types. That is, the MTT using binary and ternary splits segmentation structure removes the separation of the CU, PU, and TU concepts except for a few cases wherein CUs may be larger than PUs, e.g., when CUs have a size larger than the maximum transform length. The MTT using binary and ternary splits segmentation structure supports more flexibility for CU partition shapes. In the coding tree structure, a CU can have either a square or rectangular shape. A CTU is first partitioned by a quaternary tree (a.k.a., quadtree or quad tree) structure. Then, the quaternary tree leaf nodes can be further partitioned by a multi-type tree structure.

Figure 2:
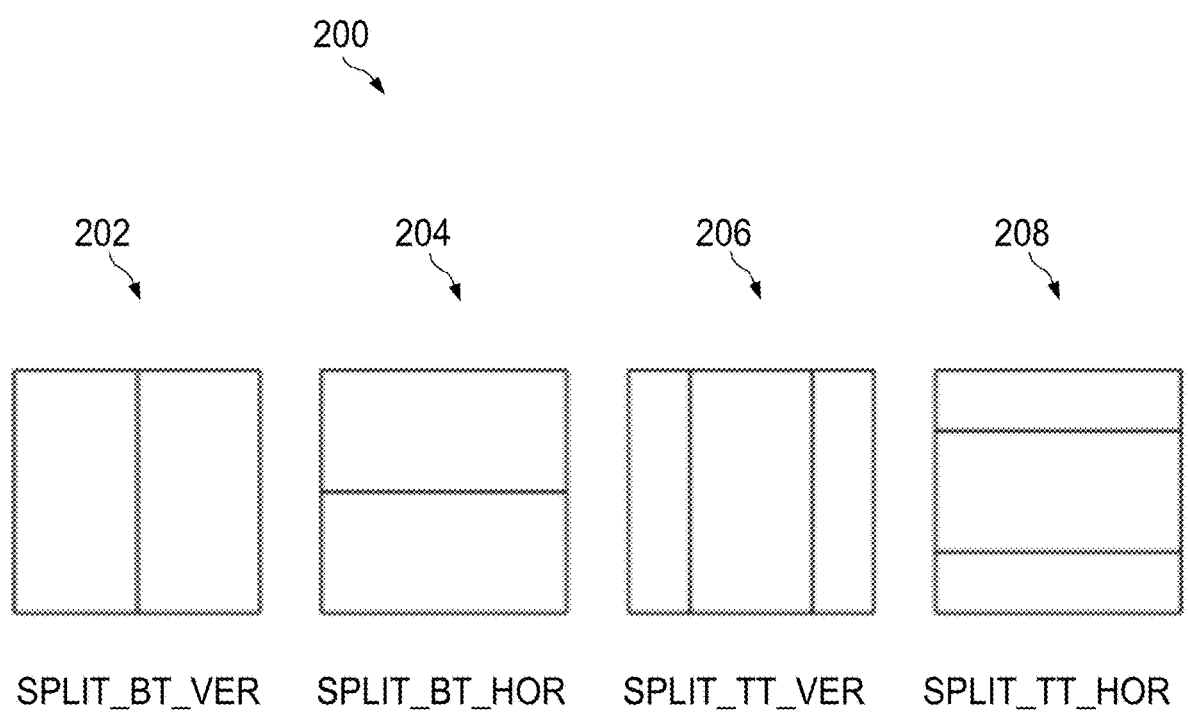
FIG. 2 is a schematic diagram of splitting types in a multi-tree structure.

FIG. 2 is a schematic diagram of splitting types 200 in a multi-tree structure. As shown in FIG. 2, there are four splitting types in multi-type tree structure: vertical binary splitting (SPLIT_BT_VER) 202, horizontal binary splitting (SPLIT_BT_HOR) 204, vertical ternary splitting (SPLIT_TT_VER) 206, and horizontal ternary splitting (SPLIT_TT_HOR) 208. The multi-type tree leaf nodes are called coding units (CUs), and unless the CU is too large for the maximum transform length, this segmentation is used for prediction and transform processing without any further partitioning. This means that, in most cases, the CU, PU, and TU have the same block size in the quadtree with nested multi-type tree coding block structure. The exception occurs when maximum supported transform length is smaller than the width or height of the color component of the CU.

Figure 3:
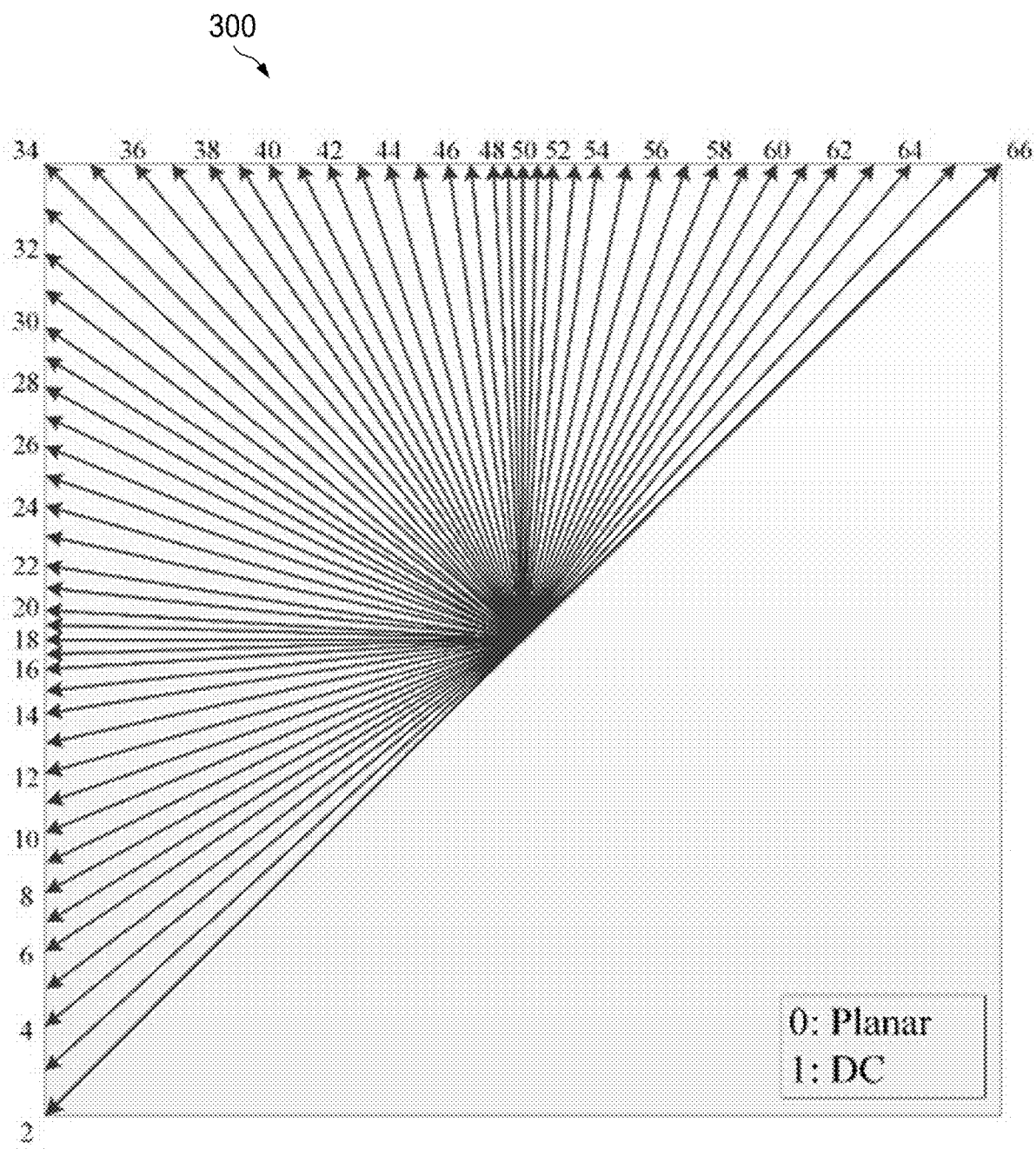
FIG. 3 is an illustration of directional modes used in video coding.

FIG. 3 is an illustration of directional modes 300 used in video coding. To capture the arbitrary edge directions presented in natural video, the number of directional intra modes is extended from 33, as used in HEVC, to 65. The additional directional modes are depicted as unnumbered arrows in FIG. 3, and the planar and DC modes remain the same. These denser directional intra prediction modes apply for all block sizes and for both luma and chroma intra predictions.

Conventional angular intra prediction directions are defined from 45 degrees to −135 degrees in clockwise direction as shown in FIG. 3. In the second version of the VTM text model (VTM2), several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using direct coded (DC) mode. In VVC, blocks can have a rectangular shape that necessitates the use of a division operation per block in the general case. To avoid division operations for DC prediction, only the longer side is used to compute the average for non-square blocks.

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, i.e., 67, and the intra mode coding is unchanged.

Figure 4A:
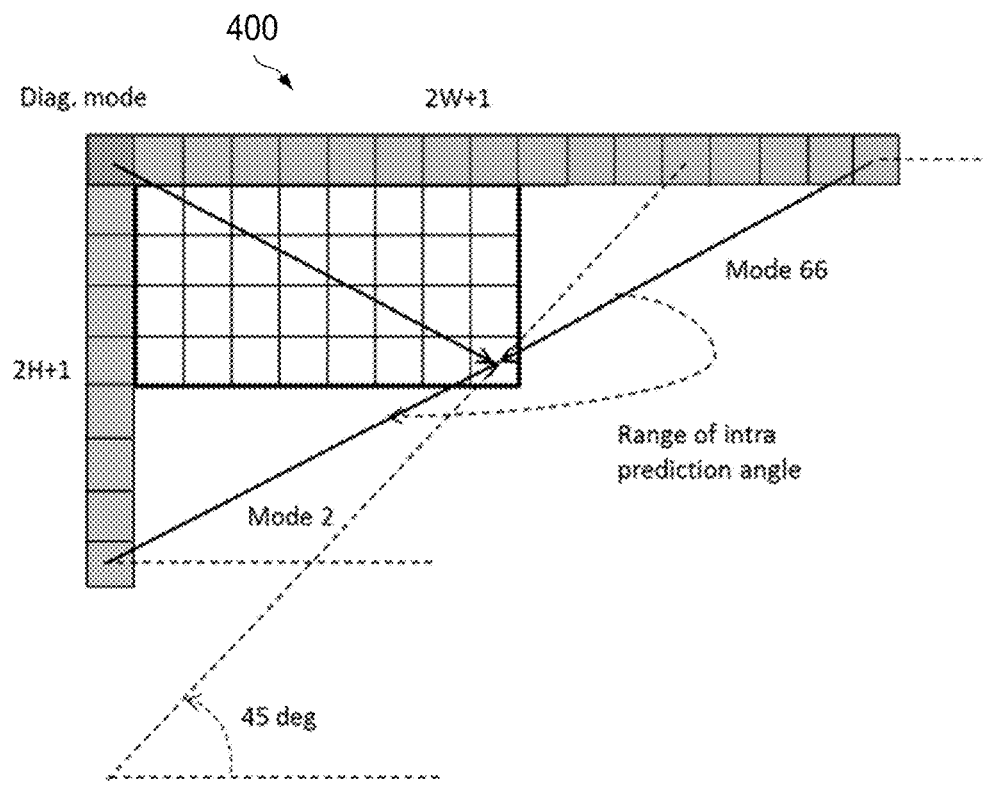
FIGS. 4A-4B are mappings between intra prediction direction and intra prediction modes with the additional direction modes.
Figure 4B:
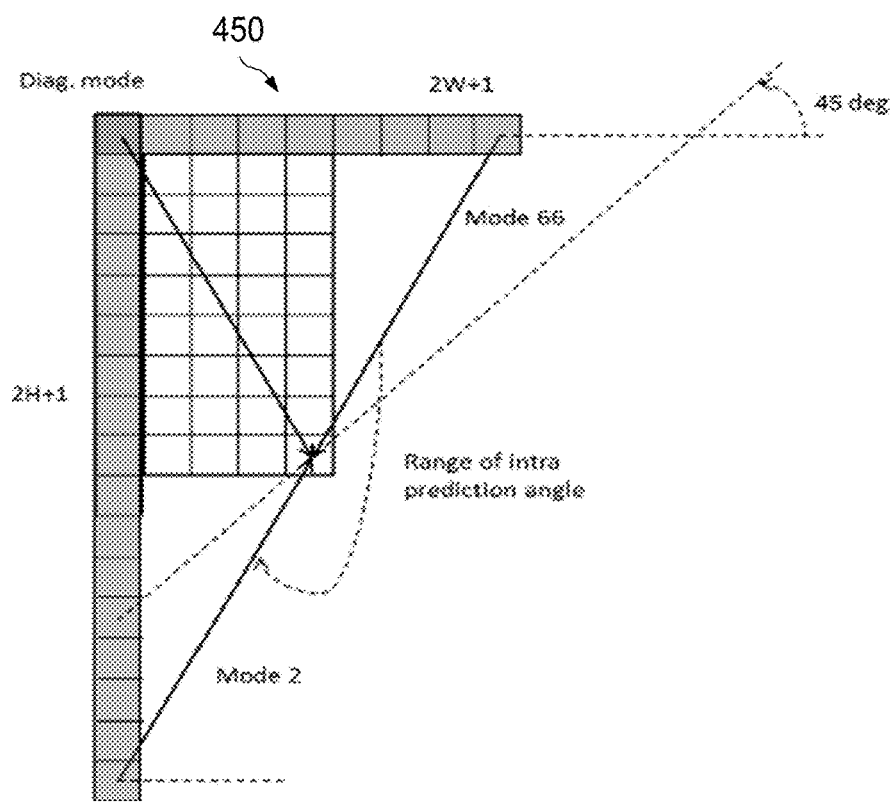

FIGS. 4A-4B are mappings 400, 450 between intra prediction direction and intra prediction modes with the additional direction modes. To support all of the prediction directions, a top reference with length 2 W+1, and the left reference with length 2H+1, are defined as shown, where W represents width and H represents height.

The mode number of replaced modes in wide-angular direction mode is dependent on the aspect ratio of a block. The replaced intra prediction modes are illustrated in Table 1.

TABLE 1

Intra prediction modes replaced by wide angular modes

| Condition | Replaced intra prediction modes |
| --- | --- |
| W/H == 2 | Modes 2, 3, 4, 5, 6, 7 |
| W/H > 2 | Modes 2, 3, 4, 5, 6, 7, 8, 9, 10, 11 |

TABLE 1-continued

Intra prediction modes replaced by wide angular modes

| Condition | Replaced intra prediction modes |
| --- | --- |
| W/H == 1 | None |
| H/W = ½ | Modes 61, 62, 63, 64, 65, 66 |
| H/W < ½ | Mode 57, 58, 59, 60, 61, 62, 63, 64, 65, 66 |

Figure 5:
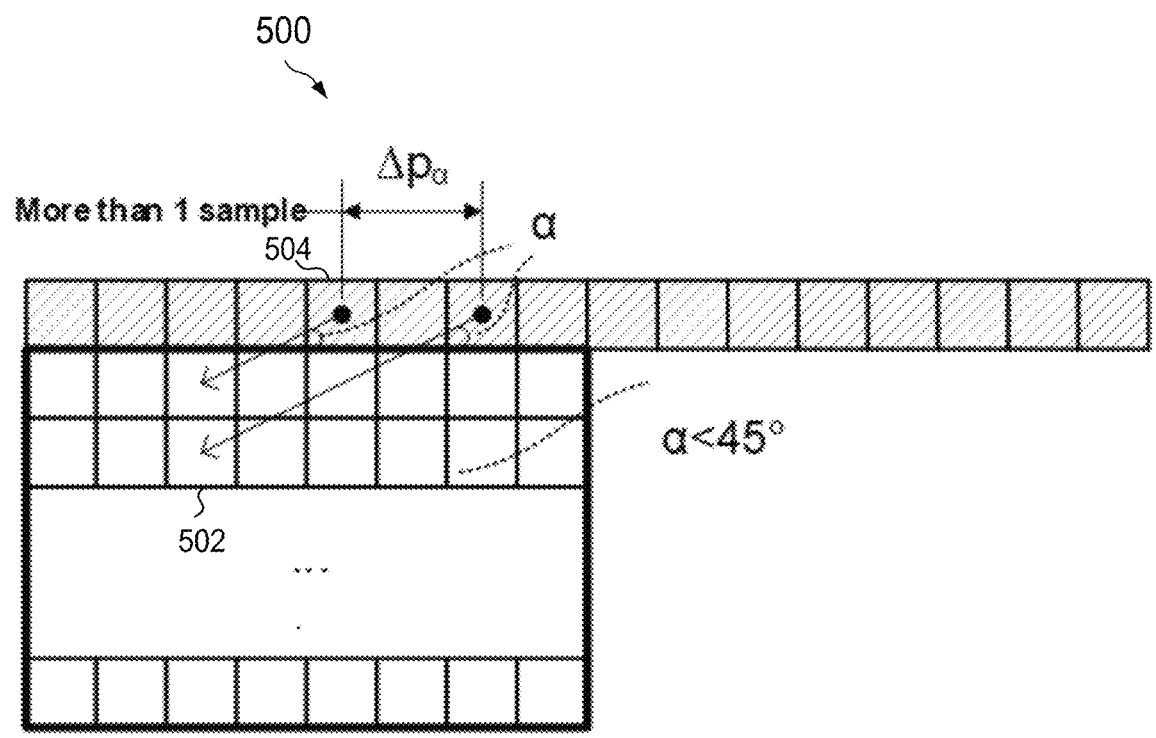
FIG. 5 is an illustration of wide-angle prediction.
Figure 6A:
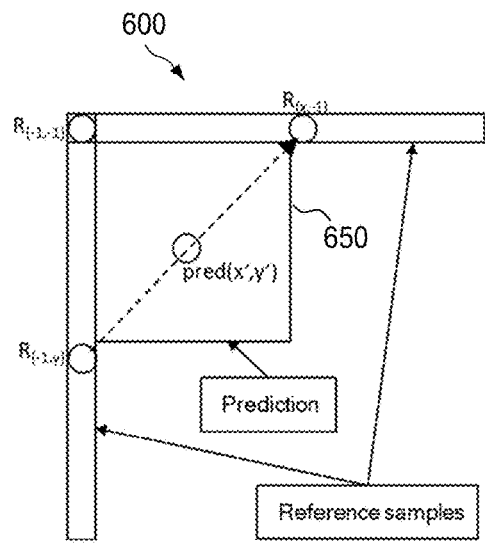
FIGS. 6A-6D are mappings that illustrate the definition of reference samples for position dependent intra prediction combination (PDPC) applied over various prediction modes.
Figure 6B:
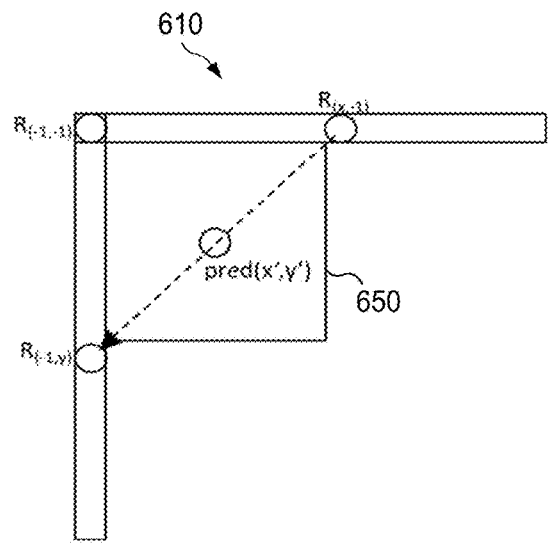
Figure 6C:
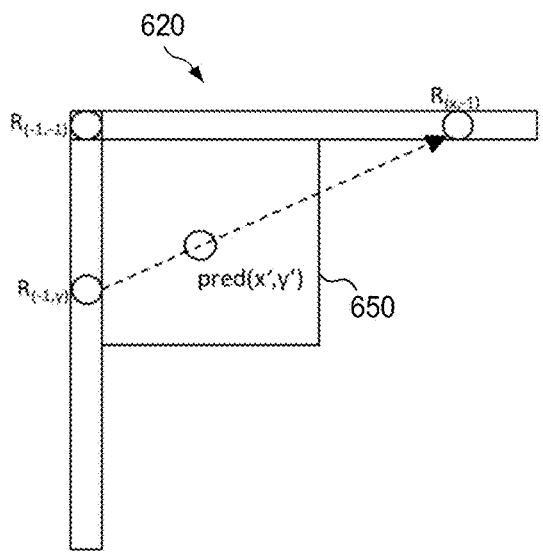
Figure 6D:
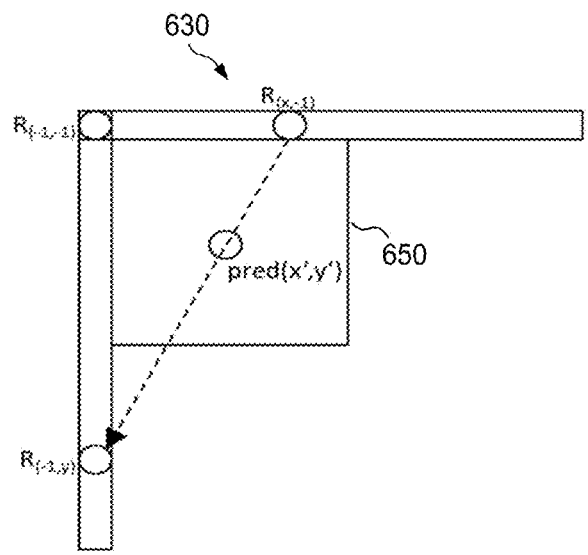

FIG. 5 is an illustration of wide-angle prediction 500. As shown in FIG. 5, two vertically-adjacent predicted samples 502 may use two non-adjacent reference samples 504 in the case of wide-angle intra prediction. Hence, a low-pass reference samples filter and side smoothing are applied to the wide-angle prediction to reduce the negative effect of the increased gap, which is represented by $\Delta p_\alpha$, where $\Delta p$ represents the distance between two reference samples (e.g., reference samples 504) at the angle $\alpha$.

In VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the following equation:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6$$

where w represents a weighting factor, L represents left, R represents right, T represents top, $R_{x,-1}$, $R_{-1,y}$ represents the reference samples located at the top and left of current sample (x, y), respectively, and $R_{-1,-1}$ represents the reference sample located at the top-left corner of the current block.

When PDPC is applied to DC, planar, horizontal, and vertical intra modes, additional boundary filters are not needed unlike in the case of HEVC DC mode boundary filter or horizontal/vertical mode edge filters.

FIGS. 6A-6D are mappings 600, 610, 620, 630 that illustrate the definition of reference samples ($R_{x,-1}$, $R_{-1,y}$ and $R_{-1,-1}$) for PDPC applied over various prediction modes. The prediction sample pred (x', y') is located at (x', y') within the prediction block 650. The coordinate x of the reference sample $R_{x,-1}$ is given by: x=x'+y'+1, and the coordinate y of the reference sample $R_{-1,y}$ is similarly given by: y=x'+y'+1.

The PDPC weights are dependent on prediction modes and are shown in Table 2.

TABLE 2

Example of PDPC weights according to prediction modes

| Prediction modes | wT | wL | wTL |
|---|---|---|---|
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

In JVET-M0102, Intra subblock partitioning (ISP) is proposed, which divides luma intra-predicted blocks vertically or horizontally into 2 or 4 sub-partitions depending on the block size dimensions, as shown in Table 3.

TABLE 3

Total number of sub-partitions depending on the block size

| Block Size | Number of Sub-Partitions |
|---|---|
| 4 × 4 | Not divided |
| 4 × 8 and 8 × 4 | 2 |
| All other cases | 4 |

Figure 7A:
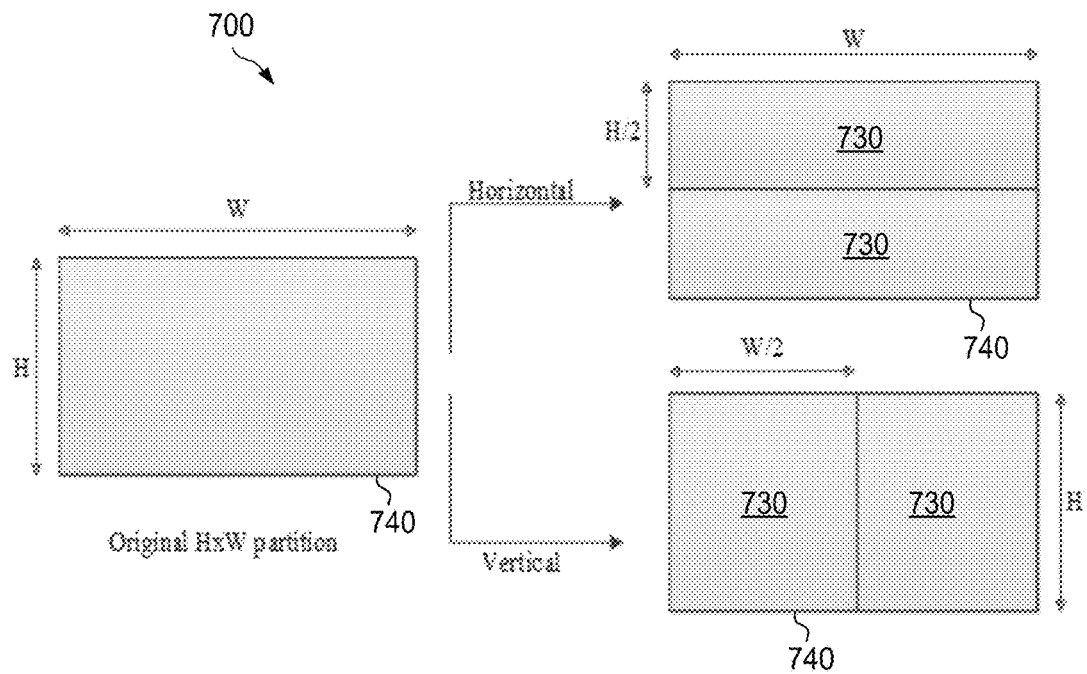
FIGS. 7A-7B illustrate examples of the two partitioning possibilities.
Figure 7B:
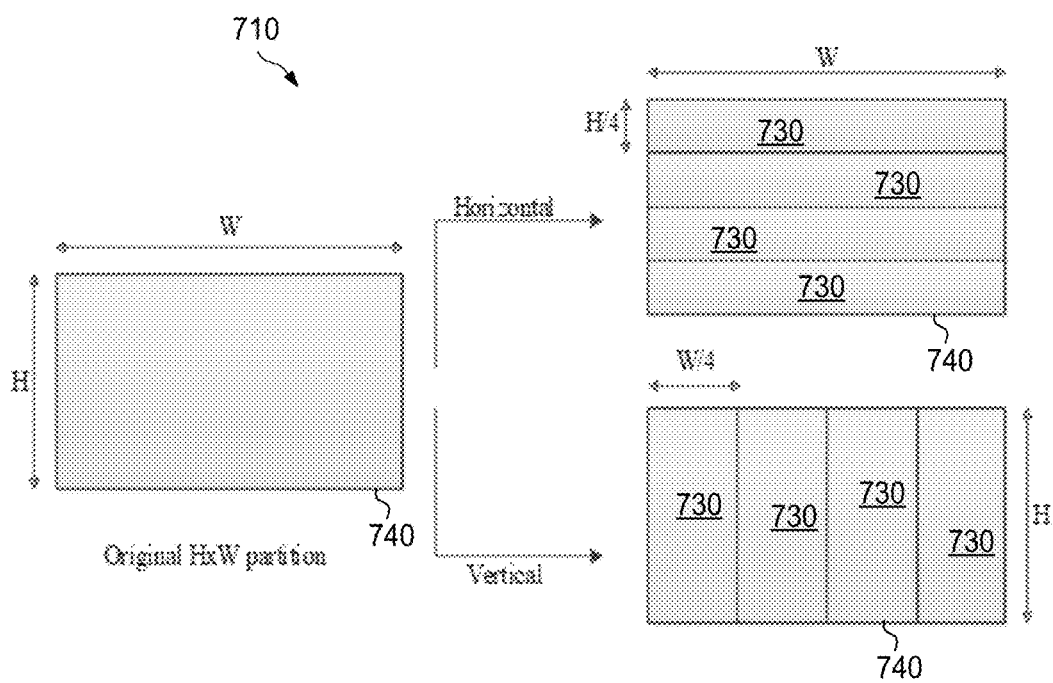

FIGS. 7A-7B illustrate examples of the two partitioning possibilities 700, 710. All sub-partitions 730 of the coding block 740 fulfill the condition of having at least 16 samples. In FIGS. FIGS. 7A-7B, W represents a width of the coding block 740, and H represents a height of the coding block 740.

For each of these sub-partitions 730, a residual signal is generated by entropy decoding the coefficients sent by the encoder and then invert quantizing and invert transforming them. Then, the sub-partitions 730 are intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions 730 share the same intra mode.

Based on the intra mode and the split utilized, two different classes of processing orders are used, which are referred to as normal and reversed order. In the normal order, the first sub-partition 730 to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with the sub-partition containing the top-right sample of the CU and continues leftwards.

In addition to the Discrete Cosine Transform II (DCT-II or DCT-2) which has been employed in HEVC, a Multiple Transform Selection (MTS) scheme is used for residual coding both inter and intra coded blocks. MTS uses multiple selected transforms from the discrete cosine transform version 8 (DCT8)/discrete cosine transform version 7 (DST7). The newly introduced transform matrices are DST-VII and DCT-VIII. Table 4 shows the basis functions of the selected DST/DCT.

TABLE 4

Transform types and basis functions

| Transform Type | Basis function $T_i(j)$, $i, j = 0, 1, \ldots, N-1$ |
|---|---|
| DCT-II (DCT2) | $T_i(j) = \omega_0 \cdot \sqrt{\frac{2}{N}} \cdot \cos\left(\frac{\pi \cdot i \cdot (2j+1)}{2N}\right)$ <br> where, $\omega_0 = \begin{cases} \sqrt{\frac{2}{N}} & i = 0 \\ 1 & i \neq 0 \end{cases}$ |
| DCT-VIII (DCT8) | $T_i(j) = \sqrt{\frac{4}{2N+1}} \cdot \cos\left(\frac{\pi \cdot (2i+1) \cdot (2j+1)}{4N+2}\right)$ |
| DST-VII (DST7) | $T_i(j) = \sqrt{\frac{4}{2N+1}} \cdot \sin\left(\frac{\pi \cdot (2i+1) \cdot (j+1)}{2N+1}\right)$ |

There are two ways to enable MTS. One way is explicit MTS, and the other way is implicit MTS.

Implicit MTS is a recent tool in VVC. The variable implicitMtsEnabled is derived as follows. Whether to enable implicit MTS is dependent on the value of a variable implicitMtsEnabled. The variable implicitMtsEnabled is derived as follows.

If sps_mts_enabled_flag is equal to 1 and one or more of the following conditions are true, implicitMtsEnabled is set equal to 1:

IntraSubPartitionsSplitType is not equal to ISP_NO_SPLIT (that is, ISP is enabled)

cu_sbt_flag is equal to 1 (that is, ISP is enabled) and Max(nTbW, nTbH) is less than or equal to 32 sps_explicit_mts_intra_enabled_flag is equal to 0 (that is, explicity MTS is disabled) and CuPredMode[0][xTbY][yTbY] is equal to MODE_INTRA and lfnst_idx[x0][y0] is equal to 0 and intra_mip_flag[x0][y0] is equal to 0

Otherwise, implicitMtsEnabled is set equal to 0.

The variable trTypeHor specifying the horizontal transform kernel and the variable trTypeVer specifying the vertical transform kernel are derived as follows based on Table 39 and Table 40 in VVC.

If one or more of the following conditions are true, trTypeHor and trTypeVer are set equal to 0 (i.e., DCT2).

cIdx is greater than 0 (that is, for a chroma component)

IntraSubPartitionsSplitType is not equal to ISP_NO_SPLIT and lfnst_idx is not equal to 0

Otherwise, if implicitMtsEnabled is equal to 1, the following applies:

If cu_sbt_flag is equal to 1, trTypeHor and trTypeVer are specified in Table 40 depending on cu_sbt_horizontal_flag and cu_sbt_pos_flag.

Otherwise (cu_sbt_flag is equal to 0), trTypeHor and trTypeVer are derived as follows:

trTypeHor=(nTbW>=4&&nTbW<=16)?1:0 (1188)

trTypeVer=(nTbH>=4&&nTbH<=16)?1:0 (1189)

Otherwise, trTypeHor and trTypeVer are specified in Table 39 depending on mts_idx.

The variables nonZeroW and nonZeroH are derived as follows.

If ApplyLfnstFlag is equal to 1 and nTbW is greater than or equal to 4 and nTbH is greater than or equal to 4, the following applies:

nonZeroW=(nTbW==4||nTbH==4)?4:8 (1190)

nonZeroH=(nTbW==4||nTbH==4)?4:8 (1191)

Otherwise, the following applies:

nonZeroW=Min(nTbW,(trTypeHor>0)?16:32) (1192)

nonZeroH=Min(nTbH,(trTypeVer>0)?16:32) (1193)

In order to control the MTS scheme, one flag is used to specify whether explicit MTS for intra/inter is present in a bitstream. In addition, two separate enabling flags are specified at sequence parameter set (SPS) level for intra and inter, respectively to indicate whether explicit MTS is enabled. When MTS is enabled at the SPS level, a CU level transform index may be signaled to indicate whether MTS is applied or not. Here, MTS is applied only for luma. The MTS CU level index (denoted by mts_idx) is signaled when the following conditions are satisfied.

Both width and height smaller than or equal to 32
CBF luma flag is equal to one
Non-TS
Non-ISP
Non-SBT
LFNST is disabled
Non-zero coefficient is existing which is not in the DC position (top-left position of a block)
There are no non-zero coefficients outside the top-left 16×16 region If the $1^{st}$ bin of mts_idx is equal to zero, then DCT-2 is applied in both directions. However, if the $1^{st}$ bin of the mts_idx is equal to one, then two more bins are additionally signaled to indicate the transform type for the horizontal and vertical directions, respectively. Transform and signaling mapping table is shown in Table 5. When it comes to transform matrix precision, 8-bit primary transform cores are used. Therefore, all the transform cores used in HEVC are kept the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 5

| Signaling of MTS | | | | | |
|---|---|---|---|---|---|
| | | | Intra/inter | | |
| $0^{th}$-bin | $1^{st}$-bin | $2^{nd}$-bin | Horizontal | Vertical | mts_idx |
| 0 | | | DCT2 | DCT2 | 0 |
| 1 | 0 | 0 | DST7 | DST7 | 1 |
| | | 1 | DCT8 | DST7 | 2 |

TABLE 5-continued

| Signaling of MTS | | | | | |
|---|---|---|---|---|---|
| | | | Intra/inter | | |
| $0^{th}$-bin | $1^{st}$-bin | $2^{nd}$-bin | Horizontal | Vertical | mts_idx |
| | 1 | 0 | DST7 | DCT8 | 3 |
| | 1 | 1 | DCT8 | DCT8 | 4 |

To reduce the complexity of large size DST-7 and DCT-8, high frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same as that for MTS in JEM4, which indicate that transform skip is applicable for a CU when both block width and height are equal to or less than 32.

Figure 8:
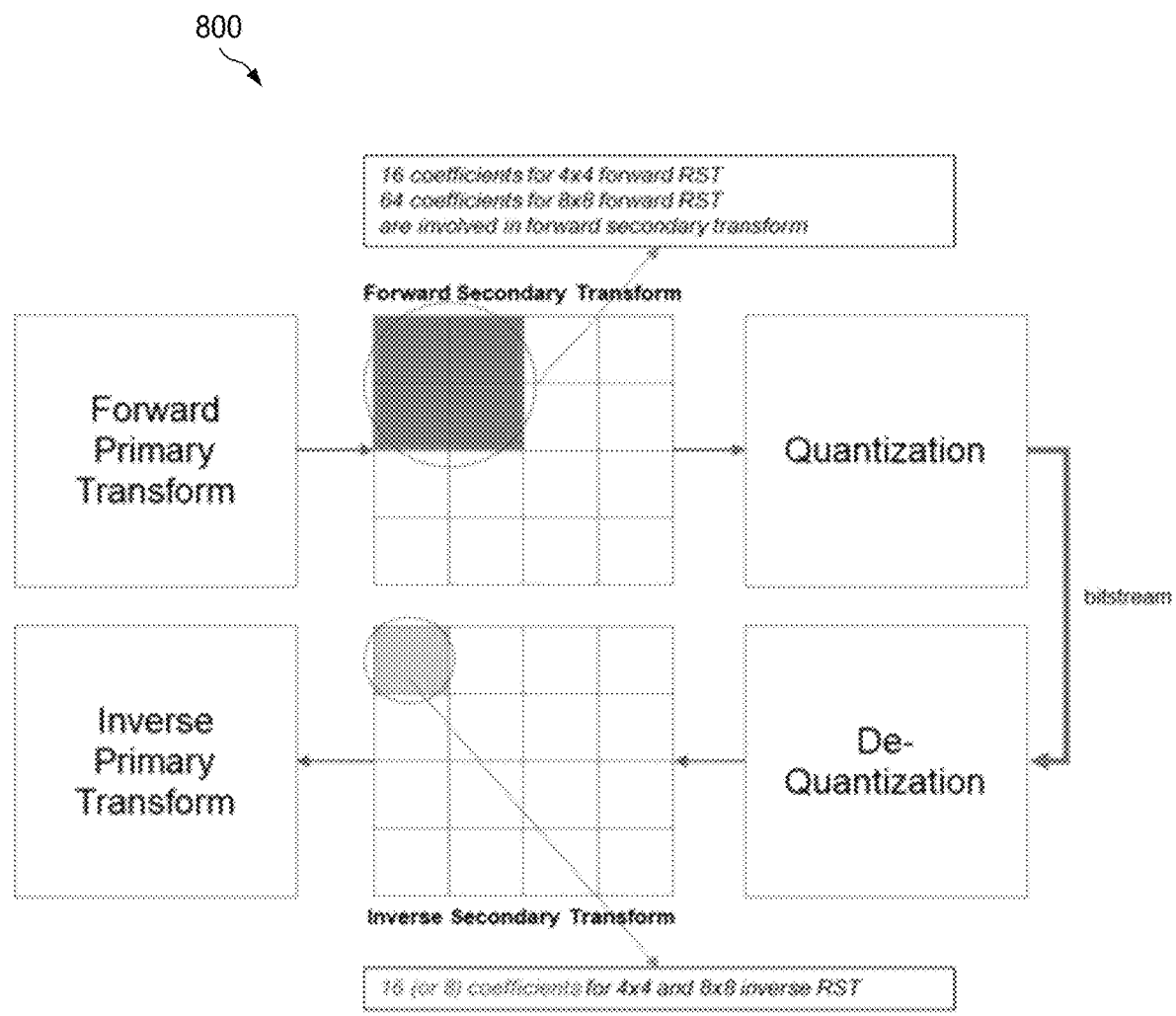
FIG. 8 illustrates an example of low frequency non-separable secondary transform (LFNST).

FIG. 8 illustrates an example of low frequency non-separable secondary transform (LFNST) 800. The LFNST 800 was introduced in JVET-K0099 and a 4 transform set (instead of 35 transform sets) mapping introduced in JVET-L0133. In JVET-N0193, 16×64 (may further be reduced to 16×48) and 16×16 matrices are employed for 8×8 and 4×4 blocks, respectively. For notational convenience, the 16×64 (may further be reduced to 16×48) transform is denoted as LFNST8×8 and the 16×16 transform as LFNST4×4.

Figure 9A:
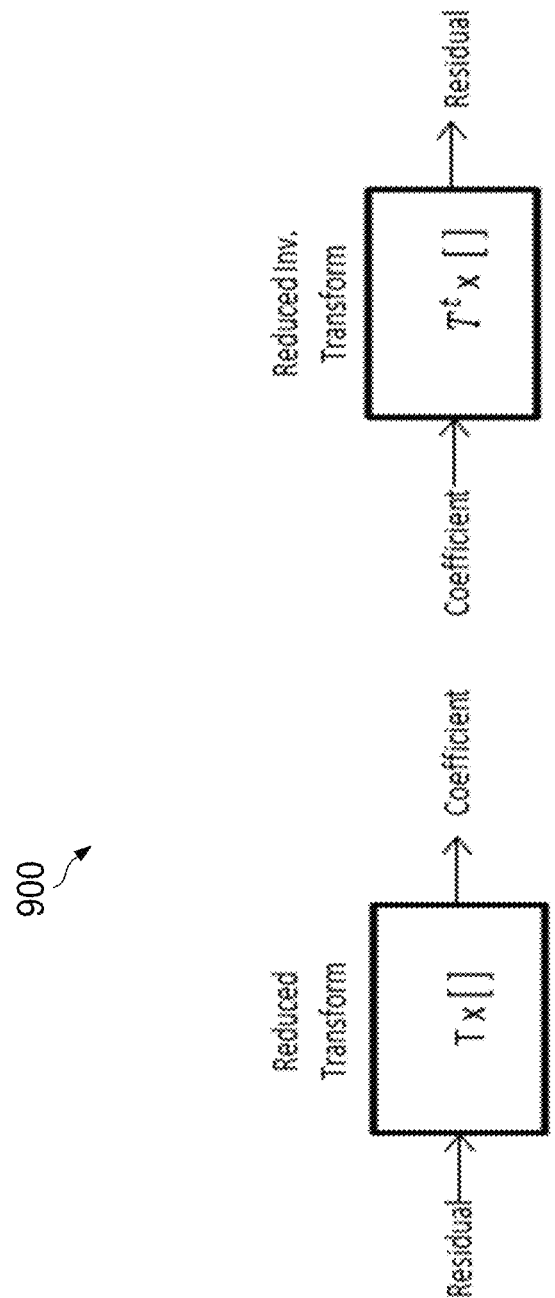
FIG. 9A illustrates forward and invert Reduced Transform (RT).

FIG. 9A illustrates forward and invert Reduced Transform (RT) 900. The main idea of an RT is to map an N dimensional vector to an R dimensional vector in a different space, where R/N (R<N) is the reduction factor. The RT matrix is an R×N matrix as follows.

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform.

In the present disclosure, the LFNST8×8 with a reduction factor of 4 (¼ size) is applied. Hence, instead of 64×64, which is conventional 8×8 non-separable transform matrix size, 16×64 direct matrix is used. In other words, the 64×16 invert LFNST matrix is used at the decoder side to generate core (primary) transform coefficients in 8×8 top-left regions. The forward LFNST8×8 uses 16×64 (or 8×64 for 8×8 block) matrices so that it produces non-zero coefficients only in the top-left 4×4 region within the given 8×8 region. In other words, when LFNST is applied then the 8×8 region except the top-left 4×4 region will have only zero coefficients. For LFNST4×4, 16×16 (or 8×16 for 4×4 block) direct matrix multiplication is applied.

An invert LFNST is conditionally applied when the following two conditions are satisfied.

a. Block size is greater than or equal to the given threshold (W>=4 && H>=4)
b. Transform skip mode flag is equal to zero When both width (W) and height (H) of a transform coefficient block is greater than 4, then the LFNST8×8 is applied to the top-left 8×8 region of the transform coefficient block. Otherwise, the LFNST4×4 is applied on the top-left min(8, W)×min(8, H) region of the transform coefficient block.

When LFNST index is equal to 0, LFNST is not applied. Otherwise, LFNST is applied, of which kernel is chosen with the LFNST index. The LFNST selection method and coding of the LFNST index are explained later.

Furthermore, LFNST is applied for intra CU in both intra and inter slices, and for both Luma and Chroma. When a dual tree is enabled, LFNST indices for Luma and Chroma are signaled separately. For inter slice (the dual tree is disabled), a single LFNST index is signaled and used for both Luma and Chroma.

In the 13$^{th}$ JVET meeting, Intra Sub-Partitions (ISP), as a new intra prediction mode, was adopted. When the ISP mode is selected, LFNST is disabled and the LFNST index is not signaled, because performance improvement was marginal even when LFNST is applied to every feasible partition block. Furthermore, disabling LFNST for ISP-predicted residual could reduce encoding complexity.

A LFNST matrix is chosen from four transform sets, each of which includes two transforms. Which transform set is applied is determined from intra prediction mode as the following.

1) If one of three cross-component linear model (CCLM) modes is indicated, transform set 0 is selected.

2) Otherwise, transform set selection is performed according to Table 6.

TABLE 6

Transform set selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access Table 6, denoted as IntraPredMode, have a range of [−14, 83], which is a transformed mode index used for wide angle intra prediction.

Affine linear weighted intra prediction (ALWIP, a.k.a. Matrix based intra prediction (MIP)) is proposed in JVET-N0217.

In JVET-N0217, two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.
Reduction of number of modes to 19 for all block shapes.
Reduction of memory requirement to 5760 10-bit values, that is 7.20 Kilobyte.
Linear interpolation of predicted samples is carried out in a single step per direction replacing iterative interpolation as in the first test.

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

Figure 9B:
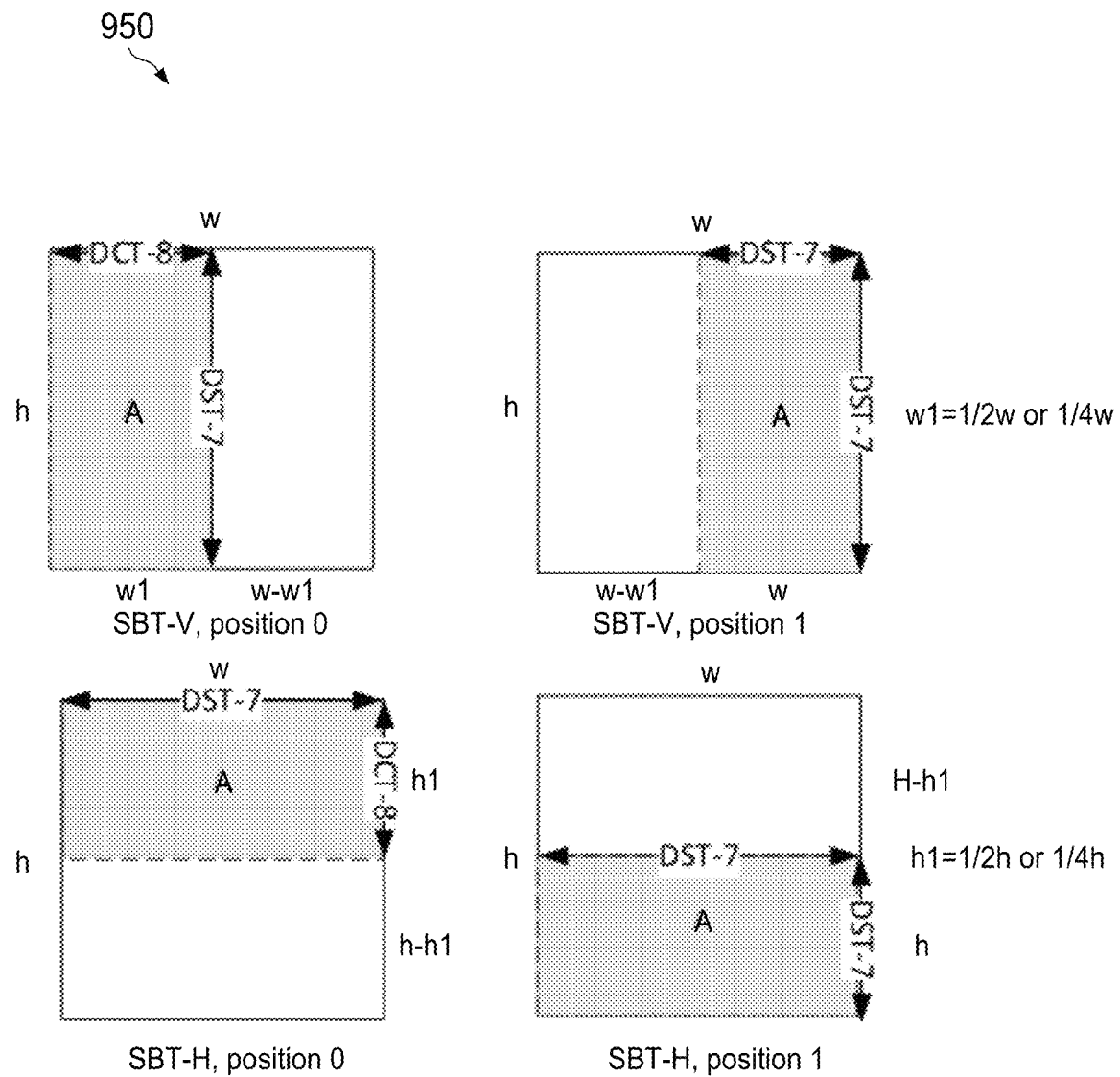
FIG. 9B illustrates the horizontal and vertical transforms for each subblock transform (SBT) position.

FIG. 9B illustrates the horizontal and vertical transforms 950 for each SBT position, where w represents a width and h represents a height. In sub-block transform, position-dependent transform is applied on luma transform blocks in SBT-V and SBT-H (chroma transform block (TB) always using DCT-2). The two positions of SBT-H and SBT-V are associated with different core transforms. More specifically, the horizontal and vertical transforms 950 for each SBT position are specified in FIG. 9B. For example, the horizontal and vertical transforms 950 for SBT-V position 0 is DCT-8 and DST-7, respectively. When one side of the residual TU is greater than 32, the corresponding transform is set as DCT-2. Therefore, the sub-block transform 950 jointly specifies the TU tiling, coded block flag (cbf), and horizontal and vertical transforms 950 of a residual block, which may be considered a syntax shortcut for the cases that the major residual of a block is at one side of the block.

In VTM, the encoder finds the appropriate partitioning structure for each coding region through a greedy search. In particular, the encoder will calculate the rate-distortion (R-D) costs of a coding region for each allowed partitioning pattern as described above and select the partitioning pattern with the minimum cost. The number of allowed partitioning patterns for each coding region could be very large and is not dependent on the region content, which leads to a large burden on the encoder.

The current encoder algorithm for searching the best split has the following problems. First, current block splitting/partitioning scheme in VTM is based on a greedy search. The greedy search needs to try a large amount of partition possibilities, and therefore, is very time consuming. Second, there are no fast algorithms for fast encoder split decision that can be adaptive to the video content.

Disclosed herein are techniques for partitioning a coding block using information received from a convolutional neural network (CNN). The techniques permit a coding apparatus (e.g., an encoder) to partition the coding block more efficiently than known techniques. For example, the techniques may include disregarding split types determined to be below a predetermined threshold when the coding block is partitioned, deriving probabilities of the split types being implemented after identifying all possible partitioning structures for the coding block and considering a predetermined number of split types and a predetermined depth, and/or examining a partitioning result of each subblock in the coding block using the split types above the predetermined threshold. Therefore, coding time is improved relative to existing coding solutions.

The listed items below should be considered as examples to explain general concepts. These examples should not be interpreted in a narrow way. Furthermore, these embodiments can be combined in any manner.

In one example, the avg function avg($x_1$, $x_2$, . . . , $x_n$) returns the average of $x_1$, $x_2$, . . . , $x_n$. In the present disclosure, certain splitting types (partitioning methods) are skipped based on their probabilities derived either in explicit manner or implicit manner.

For the implicit manner, embodiments may first predict the probabilities of having different edge types at subblock boundaries and then derive the probability of a split based on the probabilities of the subblock boundaries. When the possibility of a split is lower than a predefined threshold, the encoder will skip the check of this split. For the explicit manner, embodiments may directly predict the probability distribution of all possible partitioning structures in the ensemble partitioning space. Then, embodiments may sort all of the partitioning structures according to their probabilities. To achieve speedup, the encoder may only check splits falling in the top K of those partitioning structures and skip the rest of them, where K may be an integer, a variable, or a function.

The considered split types include at least one of Non-Split (NS), Quad-Tree (QT) split, Binary-Tree Horizontal (BTH) split, Binary-Tree Vertical (BTV) split, Ternary-Tree Horizontal (TTH) split, and Ternary-Tree Vertical (TTV) split. Those splits may be applied to one or multiple color components, such as only luma component for the dual tree partitioning and current coded color component is luma, and two chroma components for the dual tree partitioning and current coded color component is chroma, or three-color components for the single tree case.

In the implicit manner-based method, to determine whether a split for a block will be skipped or not, the process operates as follows: the input is the to-be-tested block and a split type, then the probability of the split is calculated. The calculation process will be further elaborated below. When the derived probability is greater than the predefined threshold, the split will be checked. Otherwise, the split will be skipped. In the implicit manner-based method, the process operates as follows. The input is the to-be-tested block and a split type, then an encoder will find out if the split of the block lie in the top K of sorted partitioning structures. When the answer is yes, encoder will check the split. Otherwise, the split is skipped.

For the implicit manner-based split type prediction, the following may be implemented.

1. It is proposed that the probability of a split type is derived based on the probabilities of subblock boundaries.

a. In one example, subblock boundaries are defined to be the boundaries of sub-regions within a video processing unit (e.g., a CTU/block to be coded).

i. In one example, the sub-region is defined to be M×N wherein M and/or N are integers which are pre-defined or signaled or derived on-the-fly.

1.) In one example, M=N=4.

2.) In one example, M and/or N are set to the minimum CU's width and/or height, respectively wherein the minimum CU is signaled in the bitstream.

3.) In one example, M and/or N are set to the minimum CU's width and/or height, respectively wherein the minimum CU is split from one or multiple partitioning types (e.g., QT/BT/TT).

Figure 10:
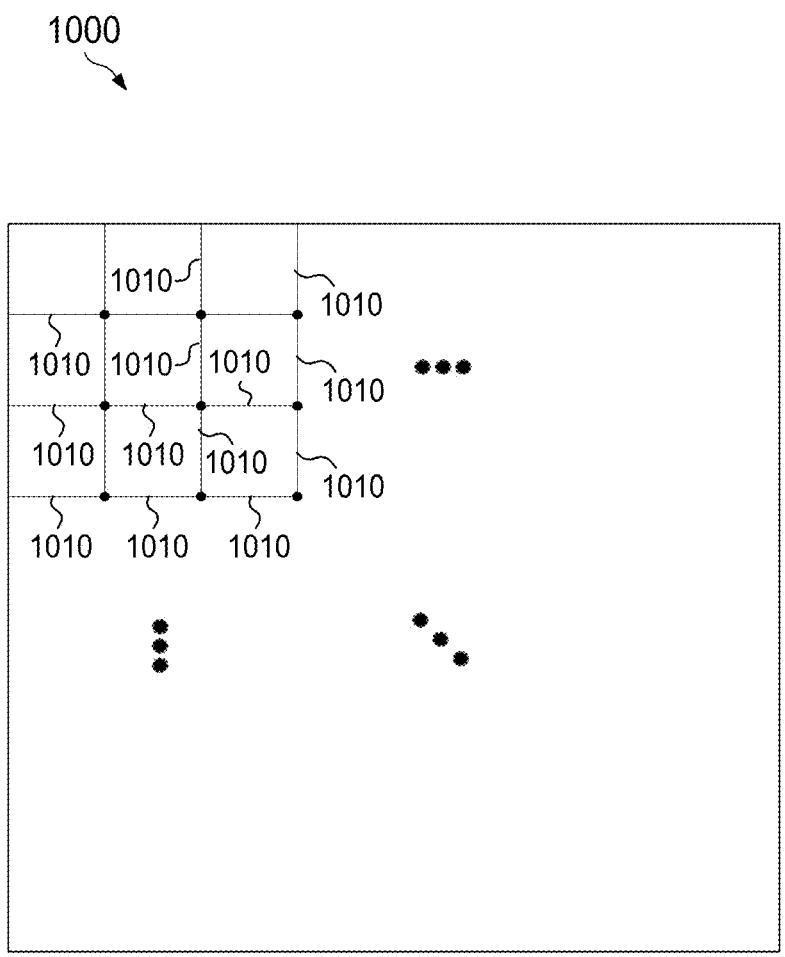
FIG. 10 illustrates an example of a 64×64 block together with its inner elementary boundaries (aligned with 4×4 block boundaries).

4.) In one example, the setting of M and/or N may depend on color component.

b. FIG. 10 illustrates an example of a 64×64 block 1000 together with its inner elementary boundaries 1010 (aligned with 4×4 block boundaries). The elementary boundaries are aligned with N×N (e.g., 4×4) blocks within the M×M block. Therefore, the number of elementary boundaries is (M/N)× (M/N)×2−(M/N)×2 (e.g., four hundred eighty (480) boundaries in FIG. 10).

2. A probability of an j-th subblock boundary within a set of subblock boundaries for a given split type within a set of allowed split types is defined.

a. In one example, the set of allowed split types is determined according to the block dimension/location/allowed splitting types signaled in a bitstream.

b. In one example, for an elementary boundary denoted by an index j, j∈{1, 2, 3, . . . , K}, suppose its type can be one of four cases: Non-split (a.k.a., no split), QT split, BT split, and TT split. And the probability distribution of the subblock boundary j can be represented as $\{p_j^{NON}, p_j^{QT}, p_j^{BT}, p_j^{TT}\}$.

c. In one example, probability distribution of subblock boundaries are derived from convolutional neural networks via a training process.

d. In one example, probability distribution of subblock boundaries are derived from other learning-based methods, such as support vector machine, linear regression, etc.

e. In one example, probability distribution of subblock boundaries are derived using a handcrafted method.

3. The probability of the to-be-tested split is calculated based on its associated subblock boundaries.

a. In one example, the probability of the to-be-tested split is defined as a function of probabilities of all subblock boundaries located in the split subblocks.

i. In one example, the function is defined as an average of probabilities.

1.) Alternatively, the function is defined as an average of probabilities.

2.) Alternatively, the function is defined as a weighted average of probabilities.

Figures 11A, 11B, 11C:
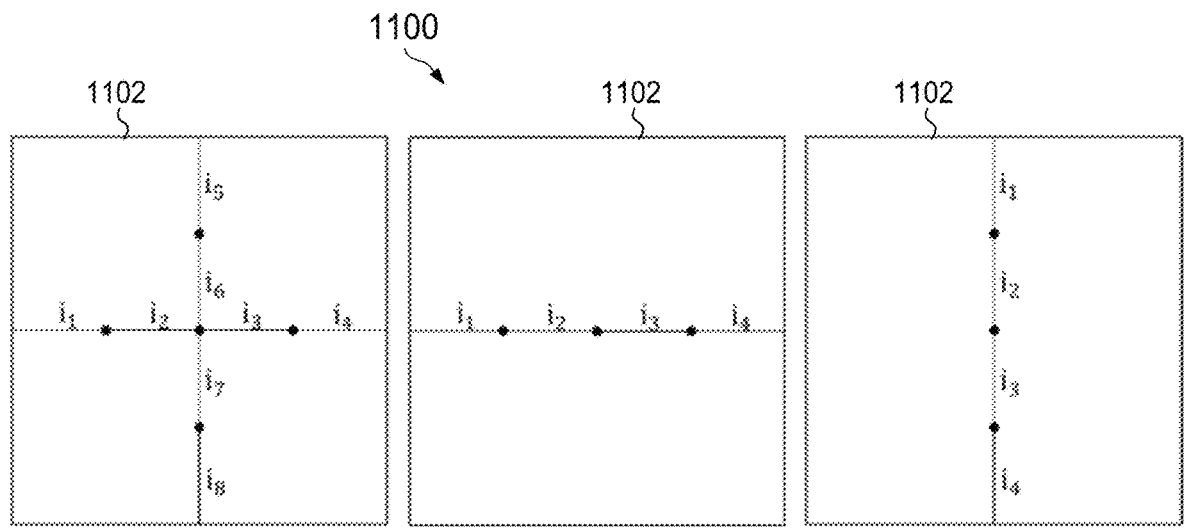
FIGS. 11A-11E illustrate examples of the five possible splits for a 16×16 coding block.
Figures 11D, 11E:
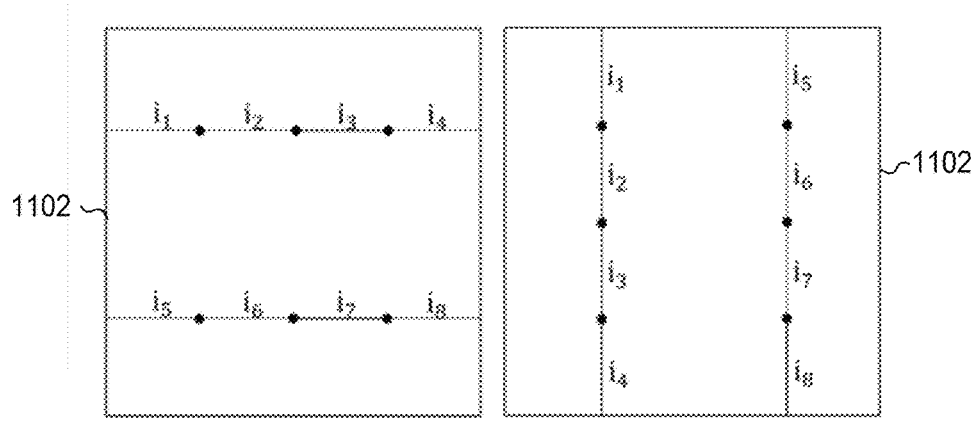

3.) Alternatively, the function is defined as a maximum function of probabilities.

ii. Alternatively, only selective subblock boundaries located in the split subblocks are utilized.

b. FIGS. 11A-11E illustrate examples of the five possible splits 1100 for a 16×16 coding block 1102. In one example as shown in FIG. 11A, the to-be-tested split is a QT split, and the block size is 16×16. Denote the associated subblock boundaries of the QT split as $i_1, i_2, \ldots i_8$. Then, the probability of the QT split can be calculated as $avg(p_{i_1}^{QT}, p_{i_2}^{QT}, \ldots, p_{i_8}^{QT})$.

c. In one example as shown in FIG. 11B, the to-be-tested split is a BTH split, and the block size is 16×16. Denote the subblock elementary boundaries of the BTH split as $i_1, i_2, i_4$. Then, the probability of the BTH split can be calculated as $avg(p_{i_1}^{BT}, p_{i_2}^{BT}, \ldots, p_{i_4}^{BT})$.

d. In one example as shown in FIG. 11C, the to-be-tested split is a BTV split, and the block size is 16×16. Denote the associated subblock boundaries of the BTV split as $i_1, i_2, \ldots i_4$. Then, the probability of the BTV split can be calculated as $avg(p_{i_1}^{BT}, p_{i_2}^{BT}, \ldots, p_{i_4}^{BT})$.

e. In one example as shown in FIG. 11D, the to-be-tested split is a TTH split, and the block size is 16×16. Denote the associated subblock boundaries of the TTH split as $i_1, i_2, \ldots i_8$. Then, the probability of the TTH split can be calculated as $avg(p_{i_1}^{TT}, p_{i_2}^{TT}, \ldots, p_{i_8}^{TT})$.

f. In one example as shown in FIG. 11E, the to-be-tested split is a TTV split, and the block size is 16×16. Denote the associated subblock boundaries of the TTV split as $i_1, i_2, \ldots i_8$. Then, the probability of the TTV split can be calculated as $avg(p_{i_1}^{TT}, p_{i_2}^{TT}, \ldots, p_{i_8}^{TT})$.

4. Encoder may also choose to check the top N splits (e.g., the N split types with highest probabilities) after sorting the possibilities of all possible splits of current block.

a. In the example shown in FIG. 11, the encoder first derived the possibilities of the five possible splits: $p^{QT}, p^{BTH}, p^{BTV}, p^{TTH},$ and $p^{TTV}$. Then, encoder sorts the five values and chooses to check 2 splits with top 2 largest possibilities.

b. In one example, in addition to the top N split types, non-split may be always checked.

5. The split type prediction process for different color components may be independent.

a. In one example, the luma split type is predicted according to luma subblock boundary probabilities while the split type of two chroma components is derived based on chroma subblock probabilities.

b. In one example, the split type of each component is predicted according to the subblock boundary probabilities of the corresponding component.

c. Alternatively, the above methods may be applied for the dual tree case and/or local dual tree case and/or separate plane coding.

6. The split type prediction process for different color components may be the same.

a. In one example, the split type is predicted according to subblock boundary probabilities of only one color component (e.g., luma).

b. In one example, the split type is predicted according to subblock boundary probabilities of all three color components.

i. In one example, the split type probabilities may be based on weighted average of all components.

1.) In one example, all the weights may be equal.

2.) In one example, the weights may be unequal.

3.) In one example, the weights may be dependent on color format.

c. Alternatively, the above methods may be applied for single tree case or inter slices.

7. Whether to and/or how to apply the proposed methods may depend on the location of blocks (e.g., coding tree blocks (CTBs)/CUs), and/or decoded information associated with blocks (e.g., depth, block width/height, prediction mode, etc.).

a. In one example, the proposed method may be only applied to blocks which are not located at video processing unit (e.g., picture/slice/tile/subpicture) boundaries.

b. In one example, when blocks are located at video processing unit (e.g., picture/slice/tile/subpicture) boundaries, the probabilities are derived based on another rule different from the above rules.

For the explicit manner-based split type prediction, the following may be implemented.

Figure 12:
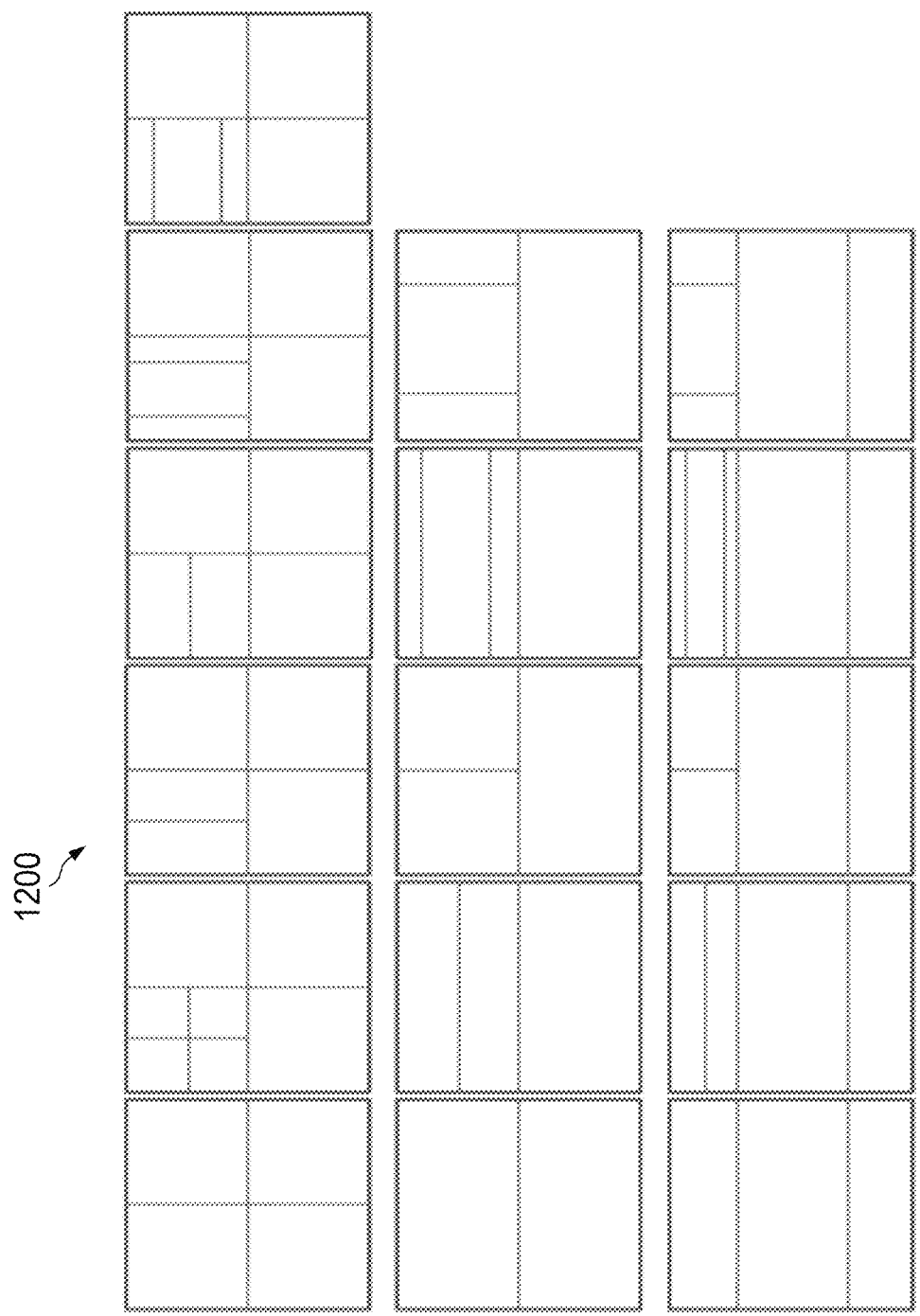
FIG. 12 is an example illustration of ensemble split types for coding blocks with a depth of 2.

8. It is proposed that the probability distribution of all possible partitioning structures in the ensemble partitioning space for a video processing unit is derived based on the outputs of CNN or any other methods.

a. In one example, all of the possible partitioning structures for a video processing unit within a certain depth are considered.

i. FIG. 12 is an example illustration of ensemble split types 1200 for coding blocks with a depth of 2. The current block selects QT split, BTH split, and TTH in the top, middle and bottom rows respectively. The possible splits of the first subblock derived by QT split, BTH split, and TTH split are shown. In one example, all of possible partitioning structures for a video processing unit within a depth of 2 are considered as shown in FIG. 12. Possible split types for the current block can be NS, QT, BTH, BTV, TTH, or TTV. In the case of the QT split type for current block, each derived subblock can select from NS, QT, BTH, BTV, TTH, TTV, as shown in the first row of FIG. 12. Therefore, the number of possible splits originating from this case is 6×6×6×6=1296. Similarly, the number of possible splits originating from BTH/BTV is 5×5=25, and the number of possible splits originating from TTH/TTV is 5×5×5=125. Consequently, the number of total splits within a depth of 2 for current block is 1296+25+25+125+125+1=1597.

9. Any suitable methods can be used to derive the probabilities of the ensemble split types as described in the last bullet.

a. In one example, a CNN is used to derive the probabilities.

i. Alternatively, the CNN output may indicate probabilities.

b. In one example, other learning-based methods, such as linear regression, support vector machine, or decision tree can be used to derive the probabilities.

10. The encoder may choose to check the splits of each subblock within a video processing unit which are contained in the top K ensemble splits after sorting the possibilities of ensemble split types of the video processing unit.

a. In one example, an encoder may choose to sort the K splits according to a number output by CNN.

b. In one example, K may be a variable.

c. In one example, K can be derived according to block statistics.

i. In one example, for blocks with larger gradients or variances, K can be larger.

A CNN-based Split Prediction for VVC intra speedup is discussed.

One example method for the implicit split prediction is as follows.

In the implicit split prediction, a CNN is trained to predict the probabilities of having different edge types at subblock boundaries. In the present disclosure, subblock is defined as 4×4 block within a 64×64 coding unit, so that the CNN only needs to run one time for the entire 64×64 coding unit, then decisions for any blocks contained in the 64×64 coding unit can be made, since their split boundaries are always aligned with some 4×4 boundaries.

Figure 13:
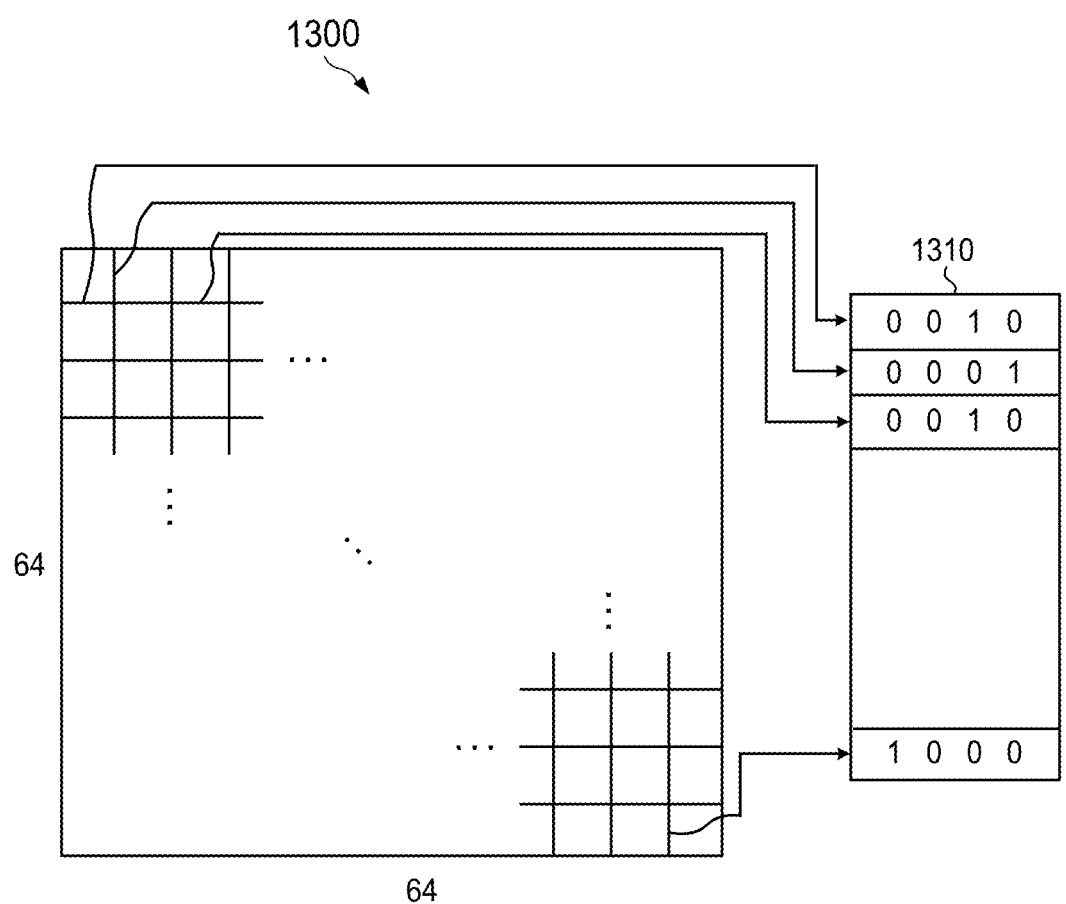
FIG. 13 illustrates an example of mapping in the implicit split prediction.

FIG. 13 illustrates an example of mapping 1300 in the implicit split prediction. It can be calculated that the total number of 4×4 boundaries inside a 64×64 coding unit is 480. For each subblock boundary, its type can be one of {SPLIT_QT, SPLIT_BT, SPLIT_TT, or NON_SPLIT}. Therefore, the ground truth probability to be predicted is a 480×4 vector 1310, as illustrated in FIG. 13. The CNN shown in FIG. 13 is adopted for predicting the 480×4 probability vector 1310.

Considering that the reference samples in the top row and the left column play an important role during intra prediction and thus have a large impact on split prediction of the current block, the input to CNN is a 65×65 block comprising the current 64×64 coding block and its reference samples. First, the input is fed into a convolutional layer and the feature maps are downscaled via the max pooling with a stride of 4. The purpose of the max pooling layer is to aggregate the dominant features and increase the valid receptive field. In addition, it also reduces the computational complexity since the later convolutions can operate at a much lower resolution. Then, the feature maps after the max pooling layer further pass through four residual blocks. Note that a max pooling layer with a stride of 2 is inserted behind every two residual blocks for the same purposes mentioned previously. At last, a fully connected layer followed by a reshaping operation is used to map the extracted features from the last pooling layer into a 4×480 probability vector, where 4 represent the number of split types that a subblock boundary could have and 480 is the number of 4×4 boundaries inside the 64×64 coding unit. Since this is a multiclass classification problem, the commonly used cross-entropy loss is chosen to drive the training process. Specifically, the cross-entropy loss is calculated for each subblock boundary and then averaged as the final loss.

Figure 14:
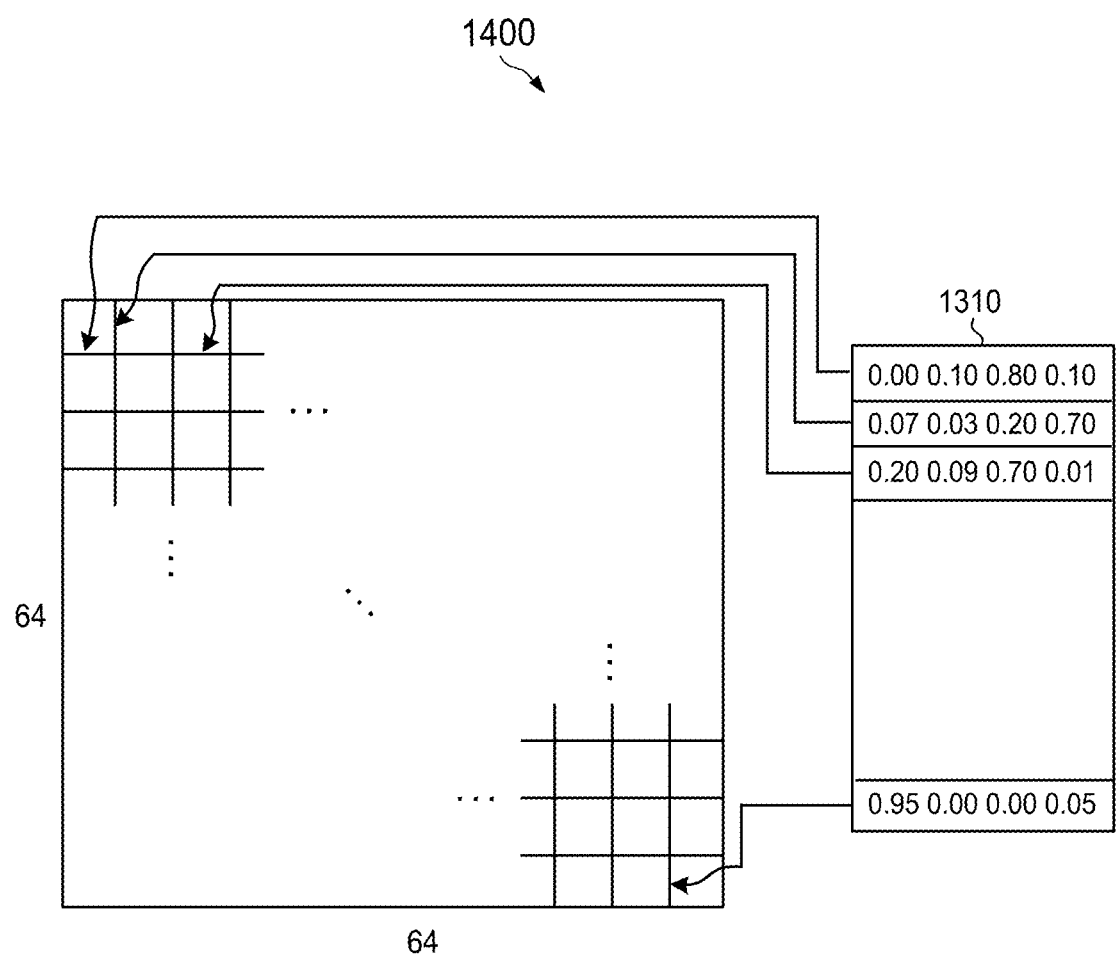
FIG. 14 illustrates an example of mapping in the implicit split prediction.

FIG. 14 illustrates an example of mapping 1400 in the implicit split prediction. After finishing the training, the probability distribution can be obtained. Note that a softmax operation is used to convert the output of CNN into valid probabilities. With the probabilities, it is straightforward to calculate the probability (or score) of each split during an R-D check. For example, the probabilities of sub-block boundaries included in a split are averaged and treated as the probability of the split. Then the encoder can skip the check of splits with probabilities lower than a predefined threshold.

To perform the explicit split prediction, the ensemble of partitioning space first needs to be determined. Without loss of generality, the size of coding unit is restricted as 32×32 and all of the possible partitioning structures within depth≤2 (assuming that depth is 0 for 32×32) are discussed.

Considering the possible splits of the 32×32 block when depth=1, there are 5 candidates including {SPLIT_QT, SPLIT_BT_HOR, SPLIT_BT_VER, SPLIT_TT_HOR, SPLIT_TT_VER}. To figure out the possible splits when depth=2, sub-blocks originated from SPLIT_QT are taken as an example. Specifically, SPLIT_QT will generate four square subblocks and each subblock can further choose from {NON_SPLIT, SPLIT_QT, SPLIT_BT_HOR, SPLIT_BT_VER, SPLIT_TT_HOR, SPLIT_TT_VER}. In other words, each subblock can have 6 types of split, resulting in 6×6×6×6=1296 possible partitioning structures. Similarly, the total number of partitioning structures originated from SPLIT_BT_HOR (or SPLIT_BT_VER) would be 5×5=25 and the total number of partitioning structures originated from SPLIT_TT_HOR (or SPLIT_TT_VER) would be 5×5×5=125. Adding those number together gives the number of partitioning structures for the 32×32 coding unit within depth 2, i.e. 1296+25×2+125×2+1=1597.

Figure 15:
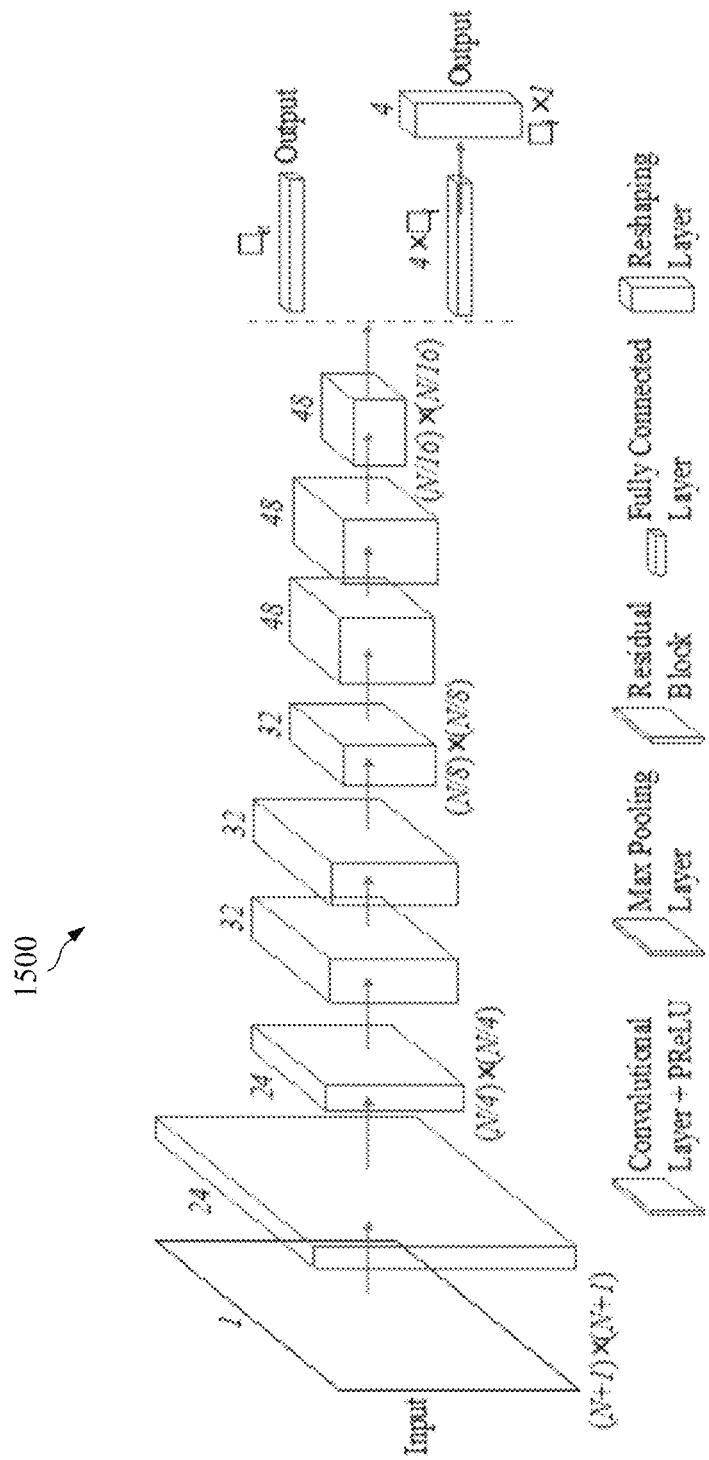
FIG. 15 shows an example of a CNN structure used for both explicit and implicit split predictions.

FIG. 15 shows an example of a CNN structure 1500 used for both explicit and implicit split predictions. Explicit and implicit prediction share the same modules located before the vertical dash line, and have different designs after the vertical dash line. N+1 represent the input block size. For the explicit split prediction, N+1 equals 33 and Me, which denotes the total number of partitioning structures considered in the present disclosure, equals 1597. While for the implicit split prediction, N+1 equals 65, and Mi, which stands for the number of inner subblock boundaries considered in the present disclosure, equals 480.

An explicit split prediction is equivalent to a multiclass classification problem as well. Therefore, the CNN is trained to solve the problem as shown in FIG. 15. The main structure of the CNN remains the same as the one used for implicit split prediction and has been introduced above. The last layer, i.e. fully connected layer, will map the extracted features from the third pooling layer into a 1597 probability vector. Cross entropy loss is then calculated and used to drive the training process.

After completing the training and obtaining the probability distribution of partitioning structures, those partitioning structures are sorted according to their probabilities. Then the encoder can decide to check splits falling in the top K of those partitioning structures and skip the rest of them to achieve encoder speedup. In practice, it is beneficial to categorize the 32×32 block into several groups according to their activities (characterized by sample gradients or sample variances) and set different K thresholds for different groups. Specifically, since it is more difficult to predict the partitioning structure of blocks with high activities, the K threshold is set higher for those blocks and vice versa.

Some experimental settings are discussed below. A PyTorch, which is an open source machine learning framework that accelerates the path from research prototyping to production deployment, is adopted as the training platform. For the training data and the validation data, the DIV2K dataset that encompasses 800 training images, and 100 validation images, is used. Separate models are trained corresponding to each test quadratic programming (QP). The trained CNN models are plugged into the reference software of VVC, i.e. VTM-7.0 for the evaluation of performances. The inference of CNN models in VTM is based on the LibTorch, i.e., the C++ interface provided by PyTorch.

The all-intra (AI) configuration and QP 22, 27, 32, 37 suggested by JVET common test conditions is used. The Bjøntegaard Delta Bit Rate (BD-BR) and $\Delta ET$ defined in Equation (1), below, is adopted to evaluate the coding efficiency and complexity reduction, respectively. In Equation (1), EncTanchor and EncTproposed represent the encoding time of VTM-7.0 anchor and VTM-7.0 plus the proposed method, respectively. Note that the running time of CNN is already included in EncTproposed. For test sequences, the common test sequences, known as Classes A1, A2, B, C, D, E, are considered.

$$\Delta ET = \frac{EncT_{anchor} - EncT_{proposed}}{EncT_{anchor}} \quad (1)$$

FIG. 16 illustrates a table 1600 that gives the performances of the proposed implicit and explicit partitioning prediction at certain thresholds. The implicit split prediction can bring on average 52.3% encoding time reduction with 0.46% BD-BR loss, while the explicit split prediction can provide on average 39.5% encoding time saving with 0.28% BD-BR loss.

The proposed method is compared with several recently published works, and the results are presented in FIG. 14. Though the compared works are based on different software versions (e.g VTM-4.0, VTM-6.1, or VTM-7.0), it should be noted that the differences among them, in terms of partitioning structures and running times, are minor. For example, running time difference is less than 5% between VTM-6.2 and VTM-7.0 according to Frank Bossen, Xiang Li, and Karsten Suehring, "Ahg report: Test model software development (ahg3)," JVET-Q0003, January 2020.

FIG. 17 illustrates a table 1700 that proposed schemes perform favorably against the method from Sang-Hyo Park and Je-Won Kang, "Context-based ternary tree decision method in versatile video coding for fast intra coding," IEEE Access, vol. 7, pp. 172597-172605, 2019, and the method from A Tissier, W Hamidouche, J Vanney, F Galpinz, and D Menard, "Cnn oriented complexity reduction of vvc intra encoder," in 2020 IEEE International Conference on Image Processing (ICIP). IEEE, 2020, pp. 3139-3143. Specifically, the method in the present disclosure is able to achieve much larger encoding complexity reduction and incur much less BD-BR loss.

Figure 18:
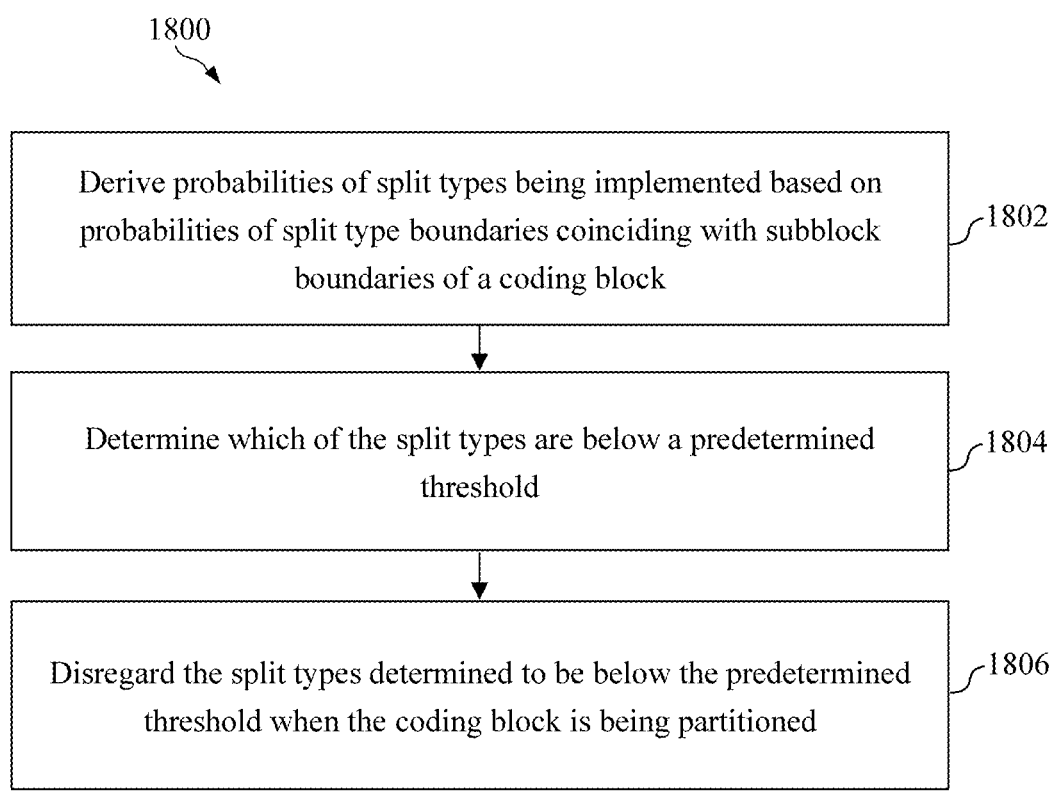
FIG. 18 is a method for coding video data according to an embodiment of the disclosure.

FIG. 18 is a method 1800 for coding video data according to an embodiment of the disclosure. The method 1800 may be performed by a coding apparatus (e.g., an encoder) having a processor and a memory. The method 1800 may be implemented when determining how to partition or split a coding block.

In block 1802, the coding apparatus derives probabilities of split types being implemented based on probabilities of split type boundaries coinciding with subblock boundaries of a coding block. In an embodiment, the split types comprise a non-split type, a quad tree split type, a binary tree split type, and a ternary tree split type.

In an embodiment, a probability of a j-th subblock boundary from the subblock boundaries is represented as $\{p_j^{NON}, p_j^{QT}, p_j^{BT}, p_j^{TT}\}$, where p represents the probability of the split type, where Non represents a non-split split type, QT represents a quad tree split type, BT represents a binary tree split type, TT represents a ternary tree split type, where j is an element of $\{1, 2, 3, \ldots K\}$, and where K represents a total number of the subblock boundaries in the coding block.

In an embodiment, the probabilities of split type boundaries coinciding with subblock boundaries are based on an a×b probability vector, where a represents a total number of split types for a subblock of the coding block, and where b represents a total number of the subblock boundaries in the coding block.

In an embodiment, the probabilities of split types being implemented is based on all of the subblock boundaries in the coding block. In an embodiment, the probabilities of split types being implemented is based on a subset of the subblock boundaries in the coding block. In an embodiment, the probabilities of the split types being implemented is an average of probabilities. In an embodiment, the probabilities of the split types being implemented is a weighted average of probabilities. In an embodiment, the probabilities of the split types being implemented is a maximum function of probabilities.

In an embodiment, one probability from the probabilities of the split types is derived based on $\text{avg}\{p_{i_1}^{ST}, p_{i_2}^{ST}, p_{i_3}^{ST}, \ldots, p_{i_x}^{ST}\}$, where p represents the probability of the split type, where i represents a subblock boundary from the subblock boundaries, where ST represents one of a quad tree split type, a horizontal binary tree split type, a vertical binary tree split type, a horizontal ternary tree split type, and a vertical ternary tree split type, and wherein x represents a number of the subblock boundaries in the coding block.

In block 1804, the coding apparatus determines which of the split types are below a predetermined threshold. For example, the coding apparatus determines that a certain number of the split types are below the predetermined threshold.

In block 1806, the coding apparatus disregards the split types determined to be below the predetermined threshold when the coding block is being partitioned. In an embodiment, the coding apparatus is configured to normalize a probability vector corresponding to the probabilities of the split type boundaries coinciding with the subblock boundaries of the coding block. In an embodiment, the coding apparatus is configured to perform a rate-distortion (R-D) check to split the coding block using the split types determined to be at or above the predetermined threshold.

Figure 19:
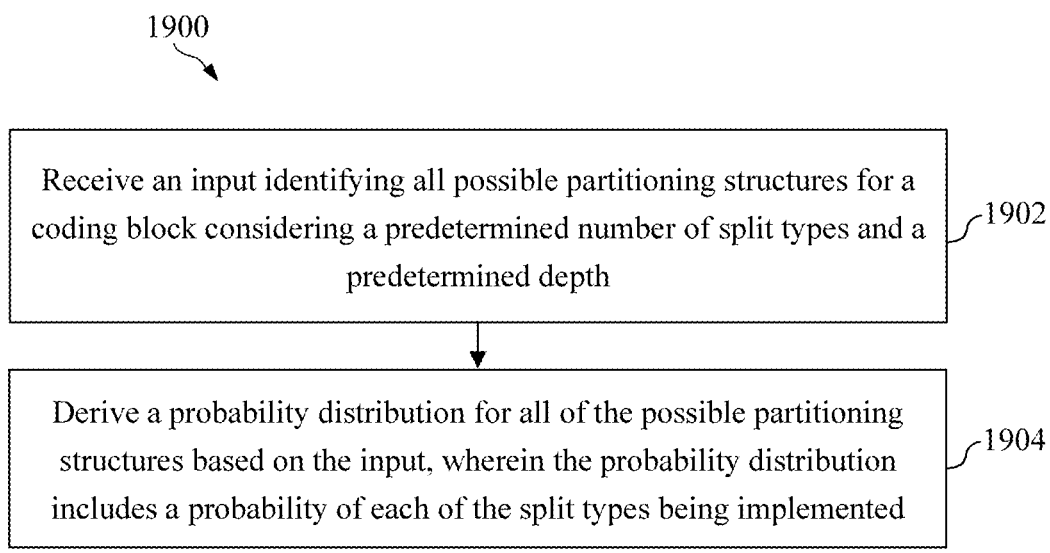
FIG. 19 is a method for coding video data according to an embodiment of the disclosure.

FIG. 19 is a method 1900 for coding video data according to an embodiment of the disclosure. The method 1900 may be performed by a coding apparatus (e.g., an encoder) having a processor and a memory. The method 1900 may be implemented when determining how to partition or split a coding block.

In block 1902, the coding apparatus receives an input identifying all possible partitioning structures for a coding block considering a predetermined number of split types and a predetermined depth. In an embodiment, the input is received from a convolutional neural network. In an embodiment, the predetermined number of split types is five, wherein the split types comprise a non-split type, a quad tree split type, a binary tree split type, and a ternary tree split type, and wherein the predetermined depth is 2.

In an embodiment, the input identifying all possible partitioning structures for the coding block is based on a sum of possible splits for a no-split type, a quad tree split type, a horizontal binary tree split type, a vertical binary tree split type, a horizontal ternary tree split type, and a vertical ternary tree split type.

In block 1904, the coding apparatus derives a probability distribution for all of the possible partitioning structures based on the input, where the probability distribution includes a probability of each of the split types being implemented. In an embodiment, the coding apparatus is configured to split the coding block based on the probability distribution.

Figure 20:
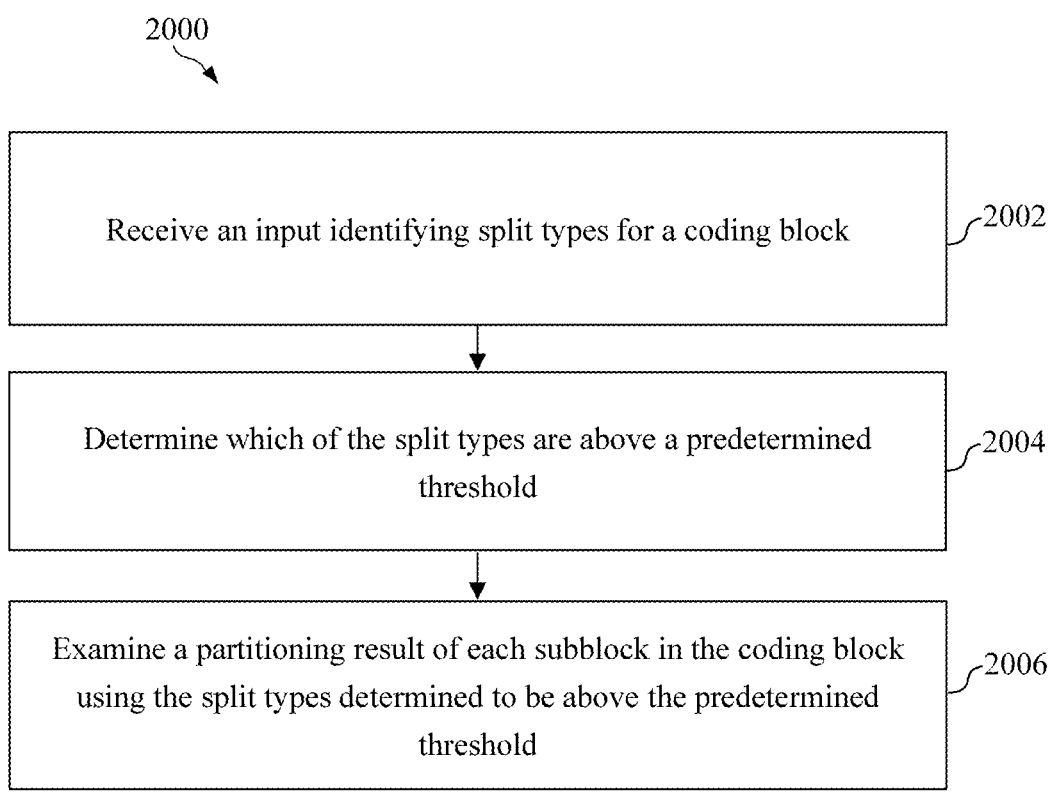
FIG. 20 is a method for coding video data according to an embodiment of the disclosure.

FIG. 20 is a method 2000 for coding video data according to an embodiment of the disclosure. The method 2000 may be performed by a coding apparatus (e.g., an encoder) having a processor and a memory. The method 2000 may be implemented when determining how to partition or split a coding block.

In block 2002, the coding apparatus receives an input identifying split types for a coding block. In an embodiment, the input is received from a convolutional neural network. In an embodiment, the split types above the predetermined threshold are determined according to K, and wherein K represents a variable or block statistics. In an embodiment, the split types above the predetermined threshold are determined according to K, and wherein a value of K depends on a gradient or variance of a coding block.

In block 2004, the coding apparatus determines which of the split types are above a predetermined threshold. In block 2006, the coding apparatus examines a partitioning result of each subblock in the coding block using the split types determined to be above the predetermined threshold. Thereafter, the coding apparatus is configured to split or partition the coding block.

Figure 21:
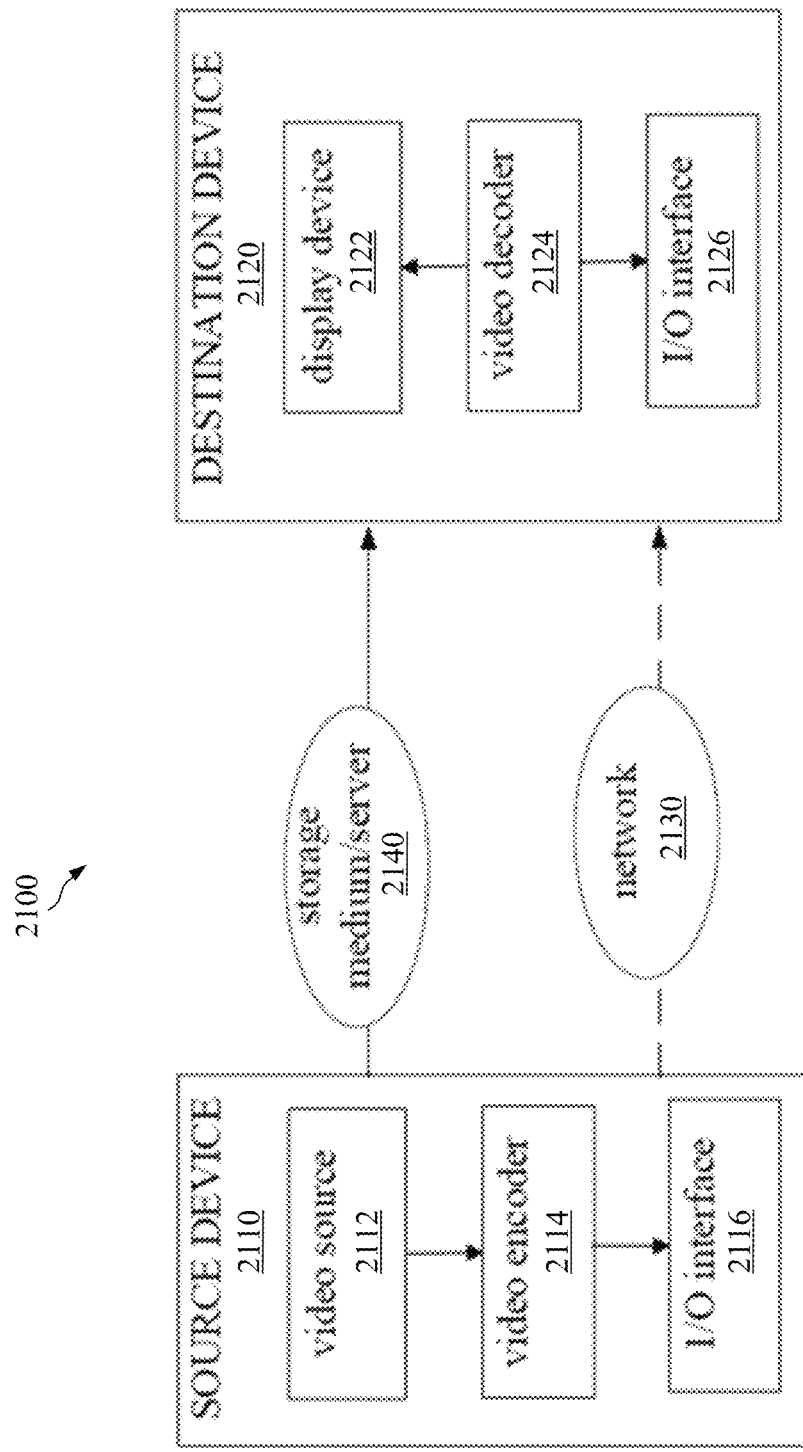
FIG. 21 is a block diagram that illustrates an example video coding system that may utilize the techniques of this disclosure.

FIG. 21 is a block diagram that illustrates an example video coding system 2100 that may utilize the techniques of this disclosure. As shown in FIG. 21, the video coding system 2100 may include a source device 2110 and a destination device 2120. Source device 2110 generates encoded video data which may be referred to as a video encoding device. Destination device 2120 may decode the encoded video data generated by source device 2110 which may be referred to as a video decoding device.

Source device 2110 may include a video source 2112, a video encoder 2114, and an input/output (I/O) interface 2116.

Video source 2112 may include a source such as a video capture device, an interface to receive video data from a video content provider, and/or a computer graphics system for generating video data, or a combination of such sources. The video data may comprise one or more pictures. Video encoder 2114 encodes the video data from video source 2112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 2116 may include a modulator/demodulator (modem) and/or a transmitter. The encoded video data may be transmitted directly to destination device 2120 via I/O interface 2116 through network 2130. The encoded video data may also be stored onto a storage medium/server 2140 for access by destination device 2120.

Destination device 2120 may include an I/O interface 2126, a video decoder 2124, and a display device 2122.

I/O interface 2126 may include a receiver and/or a modem. I/O interface 2126 may acquire encoded video data from the source device 2110 or the storage medium/server 2140. Video decoder 2124 may decode the encoded video data. Display device 2122 may display the decoded video data to a user. Display device 2122 may be integrated with the destination device 2120, or may be external to destination device 2120 which may be configured to interface with an external display device.

Video encoder 2114 and video decoder 2124 may operate according to a video compression standard, such as the High Efficiency Video Coding (HEVC) standard, Versatile Video Coding (VVC) standard, and other current and/or further standards.

Figure 22:
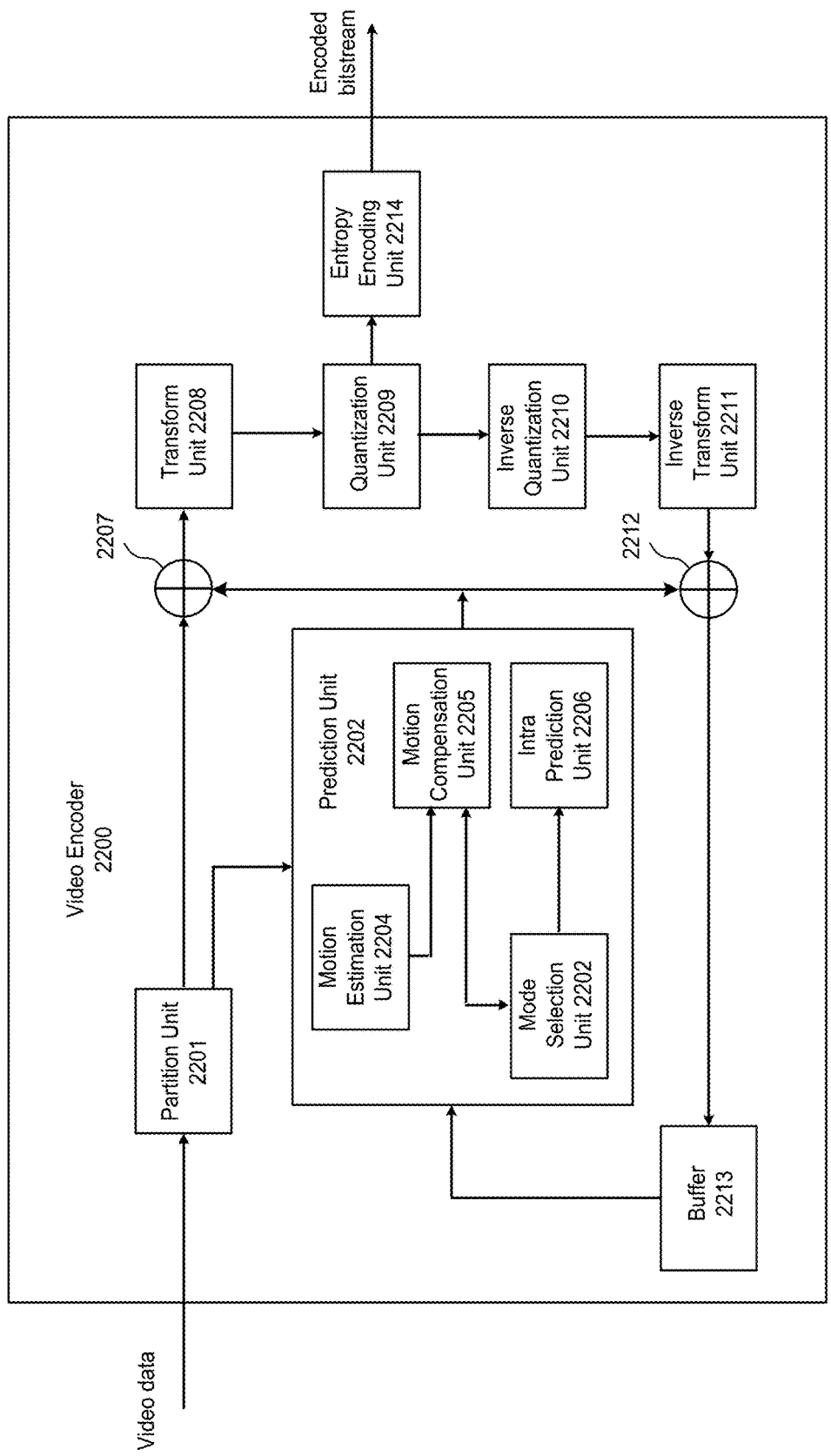
FIG. 22 is a block diagram illustrating an example of a video encoder, which may be the video encoder in the system illustrated in FIG. 21.

FIG. 22 is a block diagram illustrating an example of video encoder 2200, which may be video encoder 2114 in the video coding system 2100 illustrated in FIG. 21.

Video encoder 2200 may be configured to perform any or all of the techniques of this disclosure. In the example of FIG. 22, video encoder 2200 includes a plurality of functional components. The techniques described in this disclosure may be shared among the various components of video encoder 2200. In some examples, a processor may be configured to perform any or all of the techniques described in this disclosure.

The functional components of video encoder 2200 may include a partition unit 2201, a predication unit 2202 which may include a mode select unit 2203, a motion estimation unit 2204, a motion compensation unit 2205 and an intra prediction unit 2206, a residual generation unit 2207, a transform unit 2208, a quantization unit 2209, an inverse quantization unit 2210, an inverse transform unit 2211, a reconstruction unit 2212, a buffer 2213, and an entropy encoding unit 2214.

In other examples, video encoder 2200 may include more, fewer, or different functional components. In an example, predication unit 2202 may include an intra block copy (IBC) unit. The IBC unit may perform predication in an IBC mode in which at least one reference picture is a picture where the current video block is located.

Furthermore, some components, such as motion estimation unit 2204 and motion compensation unit 2205 may be highly integrated, but are represented in the example of FIG. 22 separately for purposes of explanation.

Partition unit 2201 may partition a picture into one or more video blocks. Video encoder 2114 and video decoder 2124 of FIG. 21 may support various video block sizes.

Mode select unit 2203 may select one of the coding modes, intra or inter, e.g., based on error results, and provide the resulting intra- or inter-coded block to a residual generation unit 2207 to generate residual block data and to a reconstruction unit 2212 to reconstruct the encoded block for use as a reference picture. In some examples, mode select unit 2203 may select a combination of intra and inter predication (CIIP) mode in which the predication is based on an inter predication signal and an intra predication signal. Mode select unit 2203 may also select a resolution for a motion vector (e.g., a sub-pixel or integer pixel precision) for the block in the case of inter-predication.

To perform inter prediction on a current video block, motion estimation unit 2204 may generate motion information for the current video block by comparing one or more reference frames from buffer 2213 to the current video block. Motion compensation unit 2205 may determine a predicted video block for the current video block based on the motion information and decoded samples of pictures from buffer 2213 other than the picture associated with the current video block.

Motion estimation unit 2204 and motion compensation unit 2205 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 2204 may perform uni-directional prediction for the current video block, and motion estimation unit 2204 may search reference pictures of list 0 or list 1 for a reference video block for the current video block. Motion estimation unit 2204 may then generate a reference index that indicates the reference picture in list 0 or list 1 that contains the reference video block and a motion vector that indicates a spatial displacement between the current video block and the reference video block. Motion estimation unit 2204 may output the reference index, a prediction direction indicator, and the motion vector as the motion information of the current video block. Motion compensation unit 2205 may generate the predicted video block of the current block based on the reference video block indicated by the motion information of the current video block.

In other examples, motion estimation unit 2204 may perform bi-directional prediction for the current video block, motion estimation unit 2204 may search the reference pictures in list 0 for a reference video block for the current video block and may also search the reference pictures in list 1 for another reference video block for the current video block. Motion estimation unit 2204 may then generate reference indexes that indicate the reference pictures in list 0 and list 1 containing the reference video blocks and motion vectors that indicate spatial displacements between the reference video blocks and the current video block. Motion estimation unit 2204 may output the reference indexes and the motion vectors of the current video block as the motion information of the current video block. Motion compensation unit 2205 may generate the predicted video block of the current video block based on the reference video blocks indicated by the motion information of the current video block.

In some examples, motion estimation unit 2204 may output a full set of motion information for decoding processing of a decoder.

In some examples, motion estimation unit 2204 may not output a full set of motion information for the current video. Rather, motion estimation unit 2204 may signal the motion information of the current video block with reference to the motion information of another video block. For example, motion estimation unit 2204 may determine that the motion information of the current video block is sufficiently similar to the motion information of a neighboring video block.

In one example, motion estimation unit 2204 may indicate, in a syntax structure associated with the current video block, a value that indicates to the video decoder 2124 that the current video block has the same motion information as another video block.

In another example, motion estimation unit 2204 may identify, in a syntax structure associated with the current video block, another video block and a motion vector difference (MVD). The motion vector difference indicates a difference between the motion vector of the current video block and the motion vector of the indicated video block. The video decoder 2124 may use the motion vector of the indicated video block and the motion vector difference to determine the motion vector of the current video block.

As discussed above, video encoder 2114 may predictively signal the motion vector. Two examples of predictive signaling techniques that may be implemented by video encoder 2114 include advanced motion vector predication (AMVP) and merge mode signaling.

Intra prediction unit 2206 may perform intra prediction on the current video block. When intra prediction unit 2206 performs intra prediction on the current video block, intra prediction unit 2206 may generate prediction data for the current video block based on decoded samples of other video blocks in the same picture. The prediction data for the current video block may include a predicted video block and various syntax elements.

Residual generation unit 2207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 2207 may not perform the subtracting operation.

Transform unit 2208 may generate one or more transform coefficient video blocks for the current video block by applying one or more transforms to a residual video block associated with the current video block.

After transform unit 2208 generates a transform coefficient video block associated with the current video block, quantization unit 2209 may quantize the transform coefficient video block associated with the current video block based on one or more quantization parameter (QP) values associated with the current video block.

Inverse quantization unit 2210 and inverse transform unit 2211 may apply inverse quantization and inverse transforms to the transform coefficient video block, respectively, to reconstruct a residual video block from the transform coefficient video block. Reconstruction unit 2212 may add the reconstructed residual video block to corresponding samples from one or more predicted video blocks generated by the predication unit 2202 to produce a reconstructed video block associated with the current block for storage in the buffer 2213.

After reconstruction unit 2212 reconstructs the video block, loop filtering operation may be performed to reduce video blocking artifacts in the video block.

Entropy encoding unit 2214 may receive data from other functional components of the video encoder 2200. When entropy encoding unit 2214 receives the data, entropy encoding unit 2214 may perform one or more entropy encoding operations to generate entropy encoded data and output a bitstream that includes the entropy encoded data.

Figure 23:
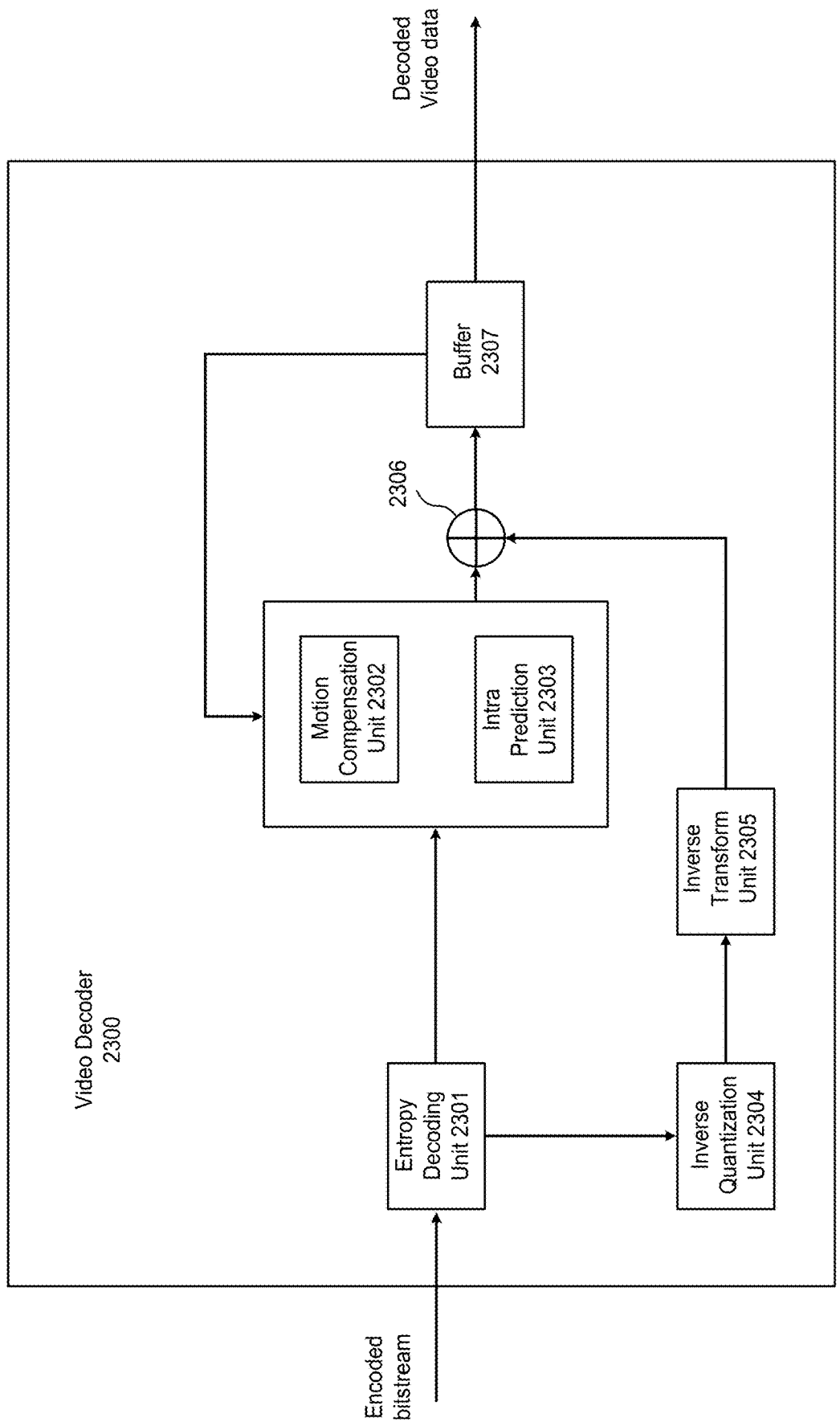
FIG. 23 is a block diagram illustrating an example of a video decoder, which may be the video decoder in the system illustrated in FIG. 21.

FIG. 23 is a block diagram illustrating an example of video decoder 2300, which may be video decoder 2124 in the video coding system 2100 illustrated in FIG. 21.

The video decoder 2300 may be configured to perform any or all of the techniques of this disclosure. In the example of FIG. 23, the video decoder 2300 includes a plurality of functional components. The techniques described in this disclosure may be shared among the various components of the video decoder 2300. In some examples, a processor may be configured to perform any or all of the techniques described in this disclosure.

In the example of FIG. 23, video decoder 2300 includes an entropy decoding unit 2301, a motion compensation unit 2302, an intra prediction unit 2303, an inverse quantization unit 2304, an inverse transformation unit 2305, and a reconstruction unit 2306 and a buffer 2307. Video decoder 2300 may, in some examples, perform a decoding pass generally reciprocal to the encoding pass described with respect to video encoder 2114 (FIG. 21).

Entropy decoding unit 2301 may retrieve an encoded bitstream. The encoded bitstream may include entropy coded video data (e.g., encoded blocks of video data). Entropy decoding unit 2301 may decode the entropy coded video data, and from the entropy decoded video data, motion compensation unit 2302 may determine motion information including motion vectors, motion vector precision, reference picture list indexes, and other motion information. Motion compensation unit 2302 may, for example, determine such information by performing the AMVP and merge mode signaling.

Motion compensation unit 2302 may produce motion compensated blocks, possibly performing interpolation based on interpolation filters. Identifiers for interpolation filters to be used with sub-pixel precision may be included in the syntax elements.

Motion compensation unit 2302 may use interpolation filters as used by video encoder 2114 during encoding of the video block to calculate interpolated values for sub-integer pixels of a reference block. Motion compensation unit 2302 may determine the interpolation filters used by video encoder 2114 according to received syntax information and use the interpolation filters to produce predictive blocks.

Motion compensation unit 2302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 2303 may use intra prediction modes for example received in the bitstream to form a prediction block from spatially adjacent blocks. Inverse quantization unit 2304 inverse quantizes, i.e., de-quantizes, the quantized video block coefficients provided in the bitstream and decoded by entropy decoding unit 2301. Inverse transform unit 2305 applies an inverse transform.

Reconstruction unit 2306 may sum the residual blocks with the corresponding prediction blocks generated by motion compensation unit 2302 or intra-prediction unit 2303 to form decoded blocks. If desired, a deblocking filter may also be applied to filter the decoded blocks in order to remove blockiness artifacts. The decoded video blocks are then stored in buffer 2307, which provides reference blocks for subsequent motion compensation/intra predication and also produces decoded video for presentation on a display device.

Figure 24:
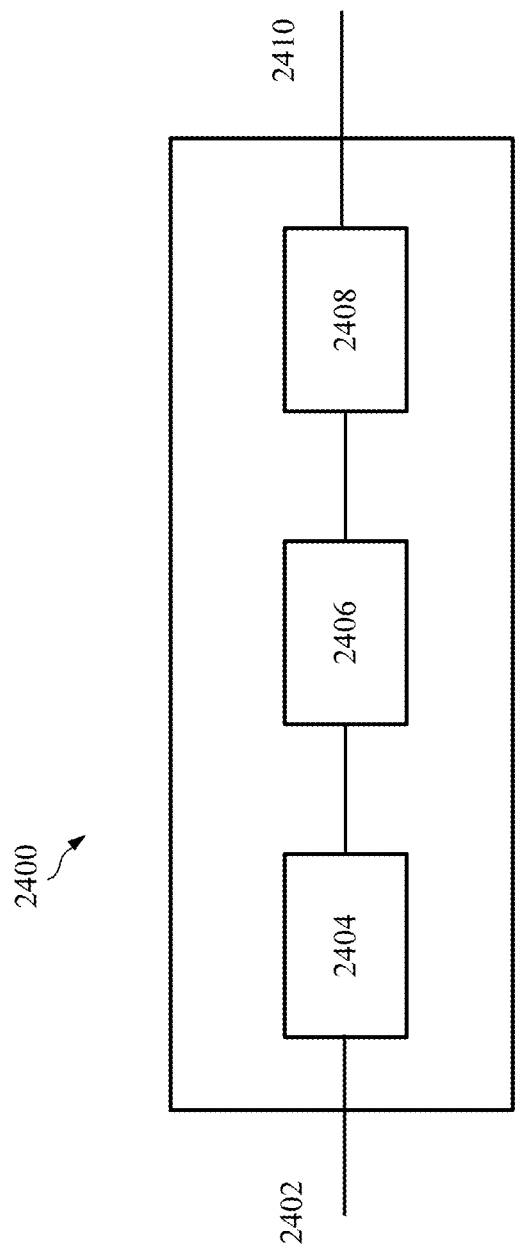
FIG. 24 is a block diagram showing an example video processing system in which various techniques disclosed herein may be implemented.

FIG. 24 is a block diagram showing an example video processing system 2400 in which various techniques disclosed herein may be implemented. Various implementations may include some or all of the components of the video processing system 2400. The video processing system 2400 may include input 2402 for receiving video content. The video content may be received in a raw or uncompressed format, e.g., 8 or 10 bit multi-component pixel values, or may be in a compressed or encoded format. The input 2402 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 2400 may include a coding component 2404 that may implement the various coding or encoding methods described in the present document. The coding component 2404 may reduce the average bitrate of video from the input 2402 to the output of the coding component 2404 to produce a coded representation of the video. The coding techniques are therefore sometimes called video compression or video transcoding techniques. The output of the coding component 2404 may be either stored, or transmitted via a communication connected, as represented by the component 2406. The stored or communicated bitstream (or coded) representation of the video received at the input 2402 may be used by the component 2408 for generating pixel values or displayable video that is sent to a display interface 2410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 25:
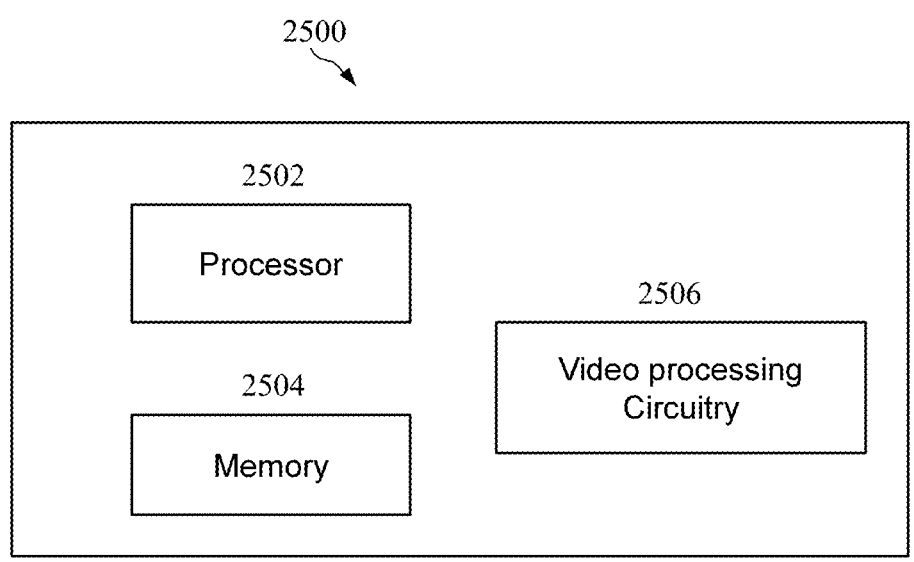
FIG. 25 is a block diagram of a video processing apparatus.

FIG. 25 is a block diagram of a video processing apparatus 2500. The apparatus 2500 may be used to implement one or more of the methods described herein. The apparatus 2500 may be embodied in a smartphone, tablet, computer, Internet of Things (IoT) receiver, and so on. The apparatus 2500 may include one or more processors 2502, one or more memories 2504 and video processing hardware 2506. The processor(s) 2502 may be configured to implement one or more methods described in the present document. The memory (memories) 2504 may be used for storing data and code used for implementing the methods and techniques described herein. The video processing hardware 2506 may be used to implement, in hardware circuitry, some techniques described in the present document. In some embodiments, the hardware 2506 may be partly or completely located within the processor 2502, e.g., a graphics processor.

Figure 26:
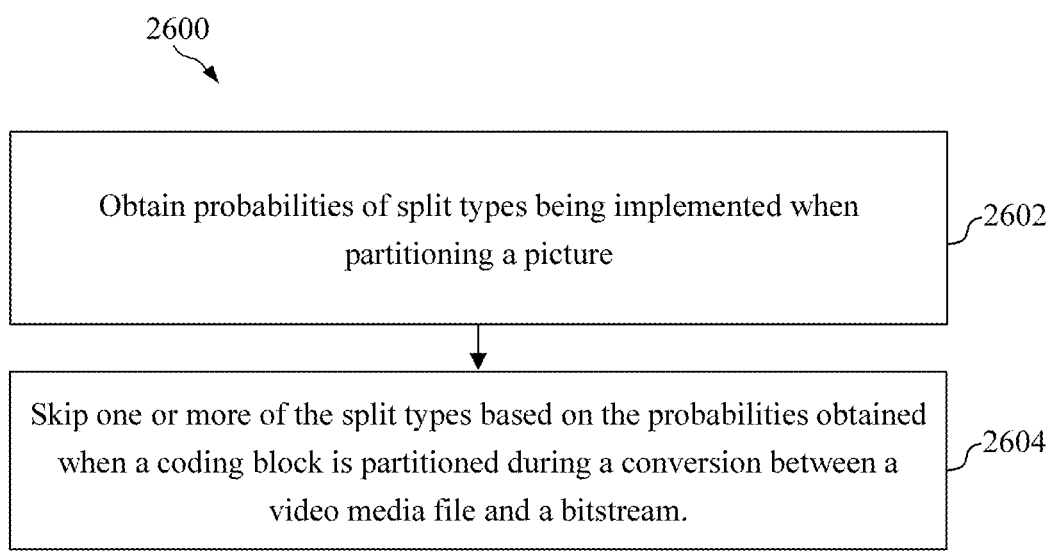
FIG. 26 is a method for coding video data according to an embodiment of the disclosure.

FIG. 26 is a method 2600 for coding video data according to an embodiment of the disclosure. The method 2600 may be performed by a coding apparatus (e.g., an encoder) having a processor and a memory. The method 2600 may be implemented when determining how to partition or split a coding block. In block 2602, the coding apparatus derives probabilities of split types being implemented when partitioning a picture. In block 2604, the coding apparatus skips one or more of the split types based on the probabilities obtained when a coding block is partitioned during a conversion between a video media file and a bitstream. In an embodiment, the method 2600 may utilize or incorporated one or more of the features or processes of the other methods disclosed herein.

In the present document, the term "digital media (e.g., images or video) or video processing" may refer to media encoding, media decoding, media compression or media decompression. The term media may refer to video, audio or image. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically EPROM (EEPROM), and flash memory devices; magnetic disks, e.g., internal hard disks or removable disks; magneto optical disks; and compact disc read-only memory (CD ROM) and digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method implemented by a video coding apparatus, comprising:
   obtaining probabilities of split types being implemented when partitioning a picture;
   determining which of the split types are below a predetermined threshold based on the probabilities; and
   skipping one or more of the split types based on the probabilities obtained when a coding block of the picture is partitioned during a conversion between a video media file and a bitstream, wherein the one or more of the split types determined to be below the predetermined threshold is skipped when the coding block is being partitioned.

2. The method of claim 1, wherein obtaining probabilities of split types being implemented further comprises deriving probabilities of split types being implemented based on probabilities of split type boundaries coinciding with subblock boundaries of the coding block.

3. The method of claim 1, wherein the split types comprise a non-split type, a quad tree split type, a binary tree split type, and a ternary tree split type.

4. The method of claim 2, wherein a probability of a j-th subblock boundary from the subblock boundaries is represented as $\{p_j^{Non}, p_j^{QT}, p_j^{BT}, p_j^{TT}\}$, where p represents the probability of the split type, where Non represents a non-split split type, QT represents a quad tree split type, BT represents a binary tree split type, TT represents a ternary tree split type, where j is an element of $\{1, 2, 3, \ldots K\}$, and where K represents a total number of the subblock boundaries in the coding block.

5. The method of claim 2, wherein the probabilities of split type boundaries coinciding with subblock boundaries are based on an a×b probability vector, where a represents a total number of split types for a subblock of the coding block, and where b represents a total number of the subblock boundaries in the coding block.

6. The method of claim 2, wherein the probabilities of split types being implemented is based on all of the subblock boundaries in the coding block, a subset of the subblock boundaries in the coding block, an average of probabilities, or a weighted average of probabilities.

7. The method of claim 1, wherein one probability from the probabilities of the split types is derived based on $avg\{p_{i_1}^{ST}, p_{i_2}^{ST}, p_{i_3}^{ST} \ldots, p_{i_x}^{ST}\}$, where p represents the probability of the split type, where i represents a subblock boundary from the subblock boundaries, where ST represents one of a quad tree split type, a horizontal binary tree split type, a vertical binary tree split type, a horizontal ternary tree split type, and a vertical ternary tree split type, and wherein x represents a number of the subblock boundaries in the coding block.

8. The method of claim 1, wherein obtaining probabilities of split types being implemented comprises receiving an input from a convolutional neural network identifying all possible partitioning structures for the coding block considering a predetermined number of split types and a predetermined depth.

9. The method of claim 8, further comprising deriving a probability distribution for all of the possible partitioning structures based on the input, wherein the probability distribution includes a probability of each of the split types being implemented.

10. The method of claim 9, wherein the input identifying all possible partitioning structures for the coding block is based on a sum of possible splits for a no-split type, a quad tree split type, a horizontal binary tree split type, a vertical binary tree split type, a horizontal ternary tree split type, and a vertical ternary tree split type.

11. The method of claim 1, wherein obtaining probabilities of split types being implemented comprises receiving an input from a convolutional neural network, the input identifying split types for the coding block.

12. The method of claim 11, further comprising determining which of the split types are above a predetermined threshold, and examining a partitioning result of each subblock in the coding block using the split types determined to be above the predetermined threshold.

13. An apparatus for coding video data comprising one or more processors and a non-transitory memory with instructions thereon, wherein the instructions upon execution by the processor cause the processor to:
  obtain probabilities of split types being implemented;
  determine which of the split types are below a predetermined threshold based on the probabilities; and
  skip one or more of the split types based on the probabilities obtained when a coding block is partitioned, wherein the one or more of the split types determined to be below the predetermined threshold is skipped when the coding block is being partitioned.

14. The apparatus of claim 13, wherein the one or more processors are further configured to derive probabilities of split types being implemented based on probabilities of split type boundaries coinciding with subblock boundaries of the coding block.

15. The apparatus of claim 13, wherein the one or more processors are further configured to receive an input from a convolutional neural network identifying all possible partitioning structures for the coding block considering a predetermined number of split types and a predetermined depth.

16. The apparatus of claim 13, wherein the one or more processors are further configured to determine which of the split types are above a predetermined threshold, and examine a partitioning result of each subblock in the coding block using the split types determined to be above the predetermined threshold.

17. A non-transitory computer readable medium comprising a computer program product for use by a coding apparatus, the computer program product comprising computer executable instructions stored on the non-transitory computer readable medium that, when executed by one or more processors, cause the coding apparatus to:
  obtain probabilities of split types being implemented;
  determine which of the split types are below a predetermined threshold based on the probabilities; and
  skip one or more of the split types based on the probabilities obtained when a coding block is partitioned, wherein the one or more of the split types determined to be below the predetermined threshold is skipped when the coding block is being partitioned.

18. The non-transitory computer readable medium of claim 17, wherein the instructions further cause the coding apparatus to derive probabilities of split types being implemented based on probabilities of split type boundaries coinciding with subblock boundaries of the coding block.

19. The non-transitory computer readable medium of claim 18, wherein the instructions further cause the coding apparatus to derive a probability distribution for all possible partitioning structures based on an input from a convolutional neural network identifying all possible partitioning structures for the coding block considering a predetermined number of split types and a predetermined depth, wherein the probability distribution includes a probability of each of the split types being implemented.

* * * * *